(12) United States Patent
Pepe et al.

(10) Patent No.: US 9,335,484 B2
(45) Date of Patent: May 10, 2016

(54) PASSIVE OPTICAL THROUGH SWITCHES

(71) Applicants:ADC Telecommunications, Inc., Berwyn, PA (US); Tyco Electronics Corporation, Berwyn, PA (US)

(72) Inventors: Paul John Pepe, Clemmons, NC (US); Joseph C. Coffey, Burnsville, MN (US)

(73) Assignee: Commscope Technologies LLC, Hickory, NC (US)

( * ) Notice: Subject to any disclaimer, the term of this patent is extended or adjusted under 35 U.S.C. 154(b) by 109 days.

(21) Appl. No.: 14/203,817

(22) Filed: Mar. 11, 2014

(65) Prior Publication Data

US 2015/0277057 A1 Oct. 1, 2015

Related U.S. Application Data

(60) Provisional application No. 61/792,098, filed on Mar. 15, 2013.

(51) Int. Cl.
*G02B 6/26* (2006.01)
*G02B 6/35* (2006.01)
*G02B 6/38* (2006.01)
*G02B 6/36* (2006.01)

(52) U.S. Cl.
CPC ............ *G02B 6/3562* (2013.01); *G02B 6/3506* (2013.01); *G02B 6/358* (2013.01); *G02B 6/3546* (2013.01); *G02B 6/3572* (2013.01); *G02B 6/3582* (2013.01); *G02B 6/3825* (2013.01); *G02B 6/3508* (2013.01); *G02B 6/3574* (2013.01); *G02B 6/3608* (2013.01)

(58) Field of Classification Search
CPC .. G02B 6/3556; G02B 6/3546; G02B 6/3548; G02B 6/3598
USPC .................................................. 385/16, 53, 57
See application file for complete search history.

(56) References Cited

U.S. PATENT DOCUMENTS

| 4,726,646 A | 2/1988 | Tanaka et al. |
| 5,542,013 A | 7/1996 | Kaplow et al. |
| 5,999,669 A | 12/1999 | Pan et al. |
| 6,556,738 B2 | 4/2003 | Pfeiffer et al. |
| 7,412,147 B2 | 8/2008 | Scadden |
| 2001/0017957 A1 | 8/2001 | Horino et al. |
| 2005/0232565 A1 | 10/2005 | Heggestad et al. |
| 2006/0133725 A1 | 6/2006 | Wang et al. |
| 2010/0202730 A1 | 8/2010 | Farnan |

FOREIGN PATENT DOCUMENTS

| EP | 0 530 927 A1 | 10/1993 |
| JP | 7-92402 | 4/1995 |
| JP | 2000-162520 | 6/2000 |

OTHER PUBLICATIONS

International Search Report and Written Opinion for PCT/US2014/023563 mailed Jul. 18, 2014.

*Primary Examiner* — Ellen Kim
(74) *Attorney, Agent, or Firm* — Merchant & Gould P.C.

(57) ABSTRACT

A passive optical fiber switch includes: a housing defining a plurality of ports configured to receive fiber optic connectors; a substrate positioned within the housing, the substrate defining a plurality of waveguide paths; and an arm positioned relative to one of the plurality of ports such that the arm moves as a fiber optic connector is positioned in the one port, movement of the arm causing the waveguide paths to shift to break a normal through configuration.

14 Claims, 29 Drawing Sheets

FIG. 4
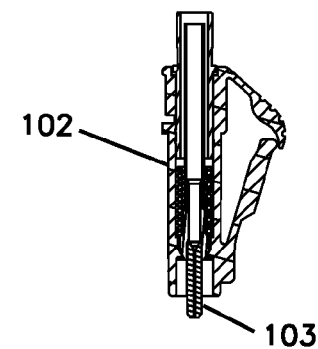
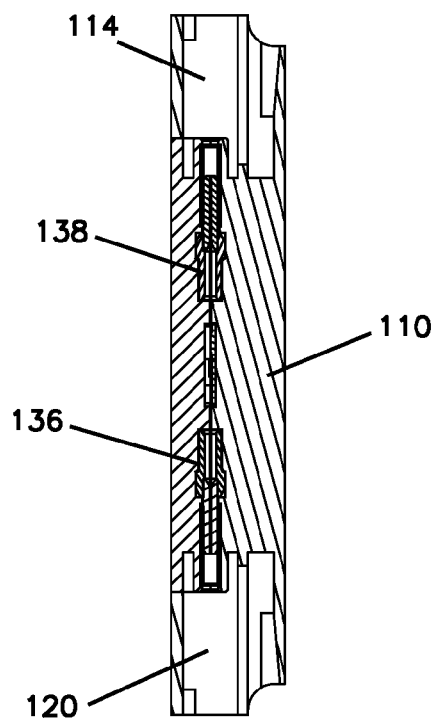
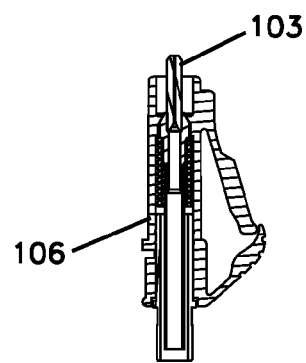
FIG. 5
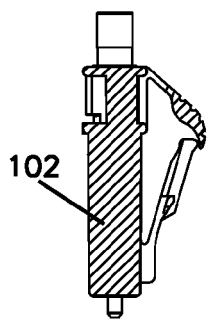
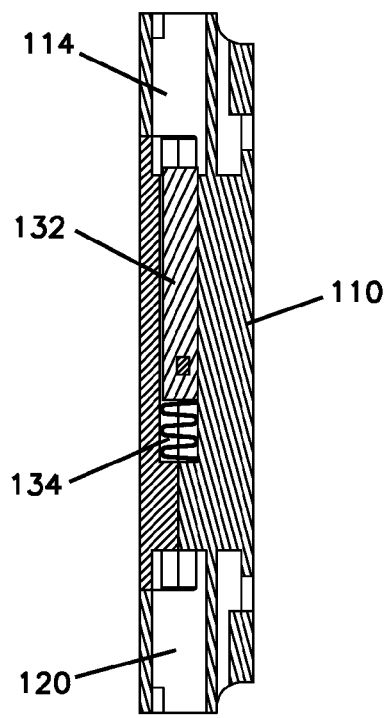
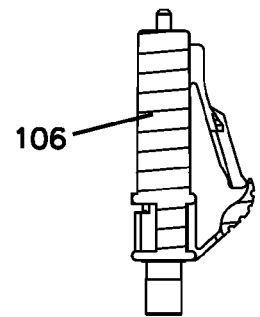

FIG. 11
FIG. 12
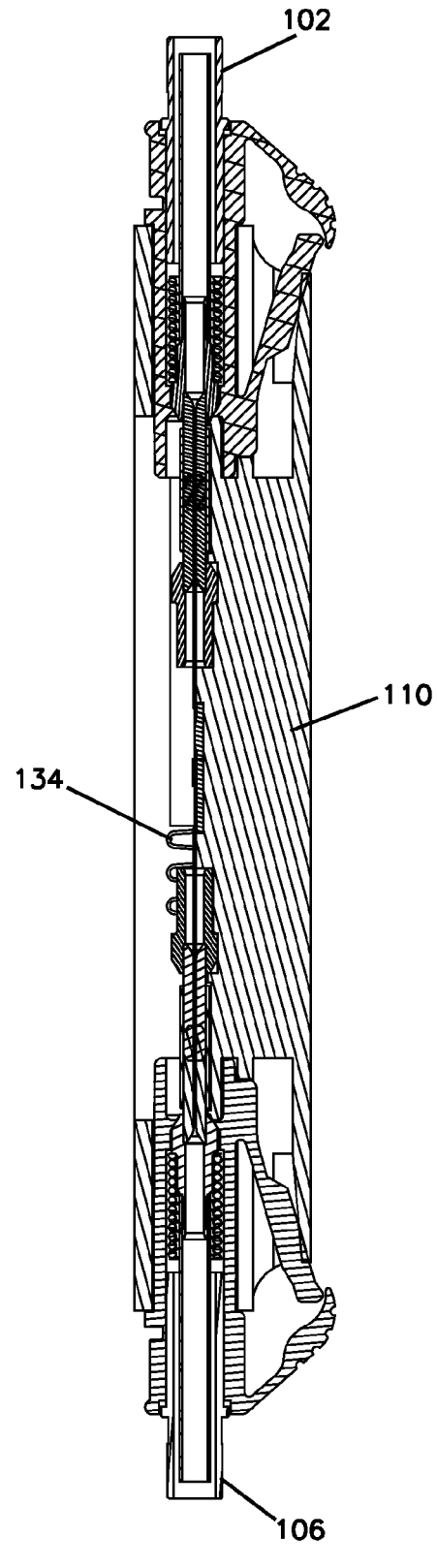
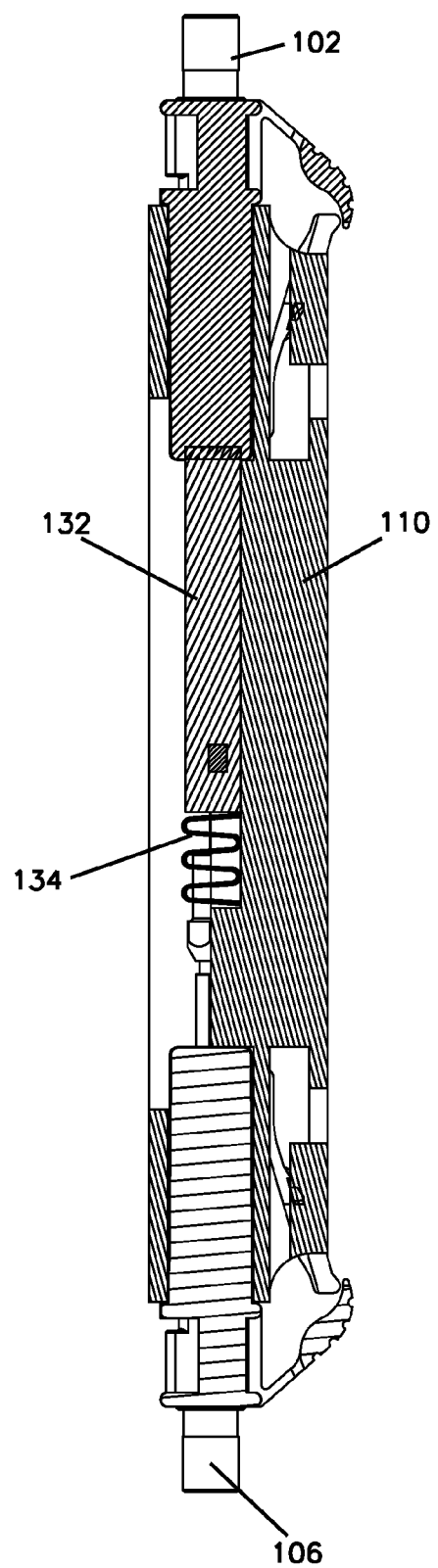

FIG. 18
FIG. 19
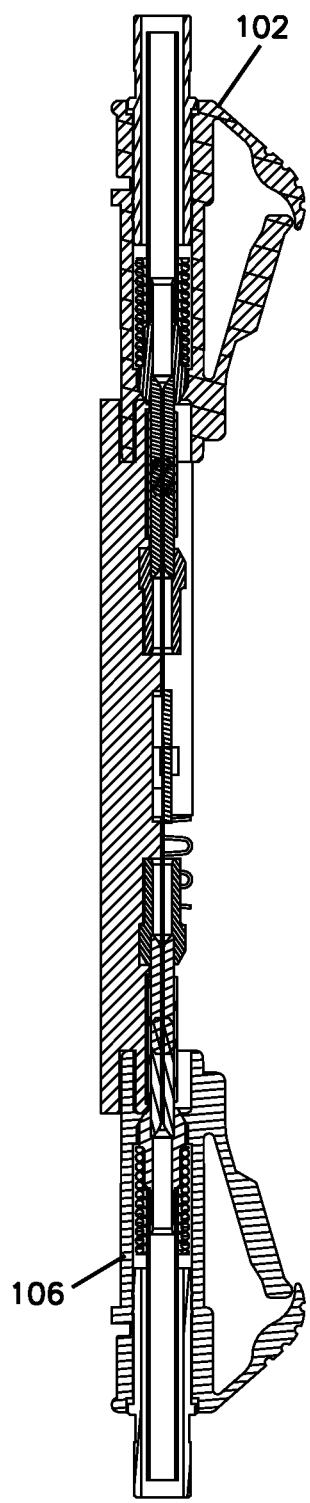
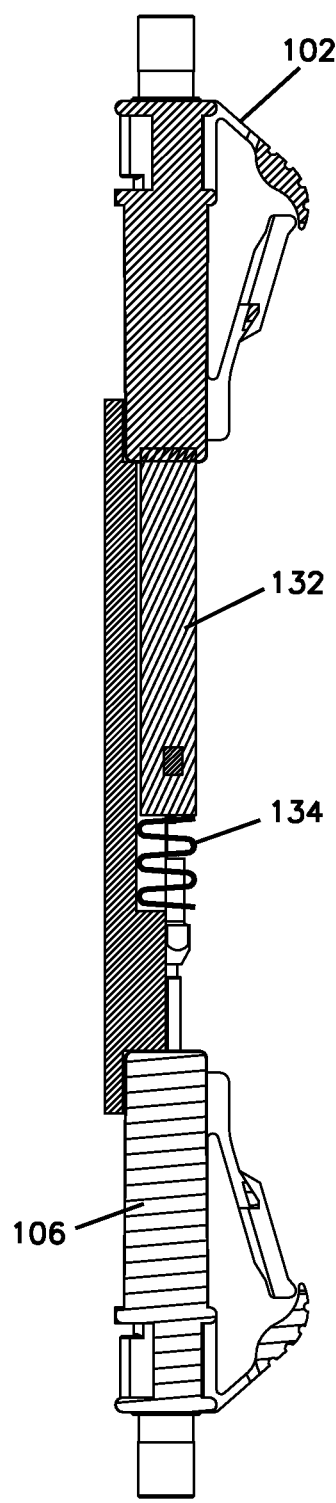

FIG. 25
FIG. 26
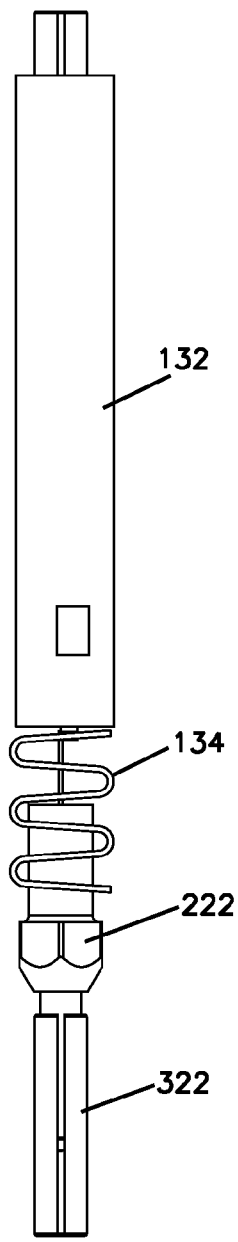
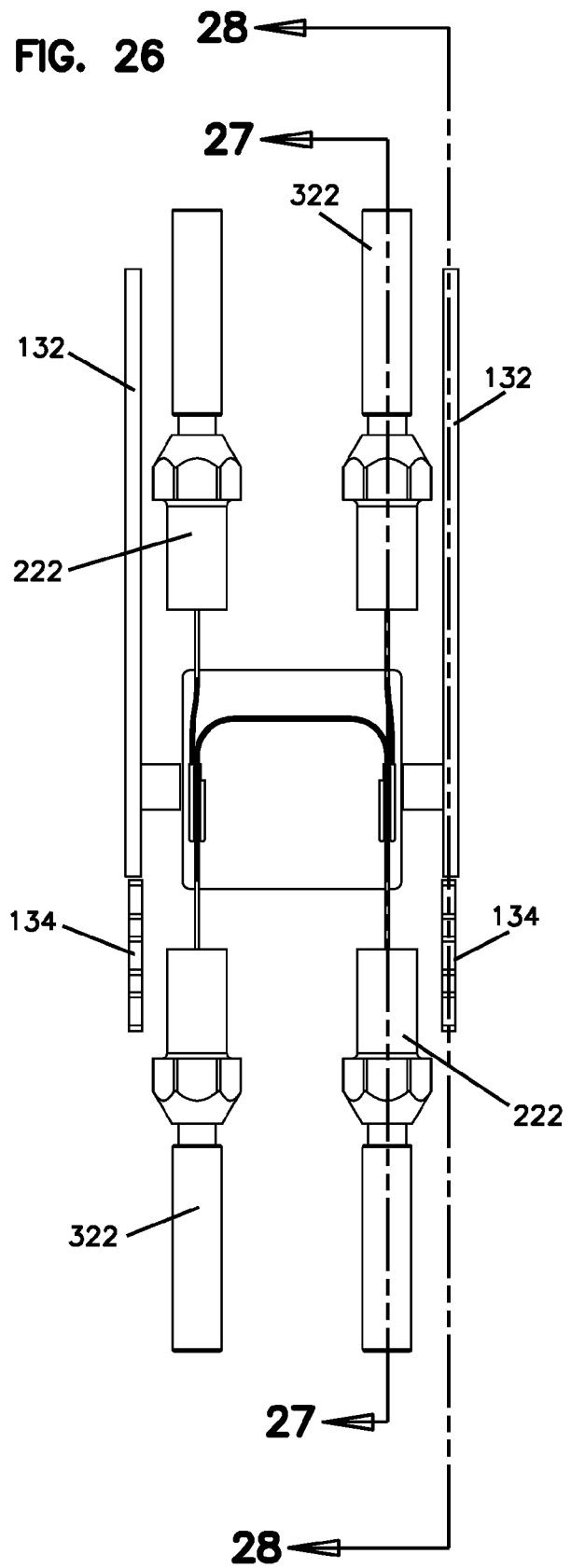

FIG. 27
FIG. 28
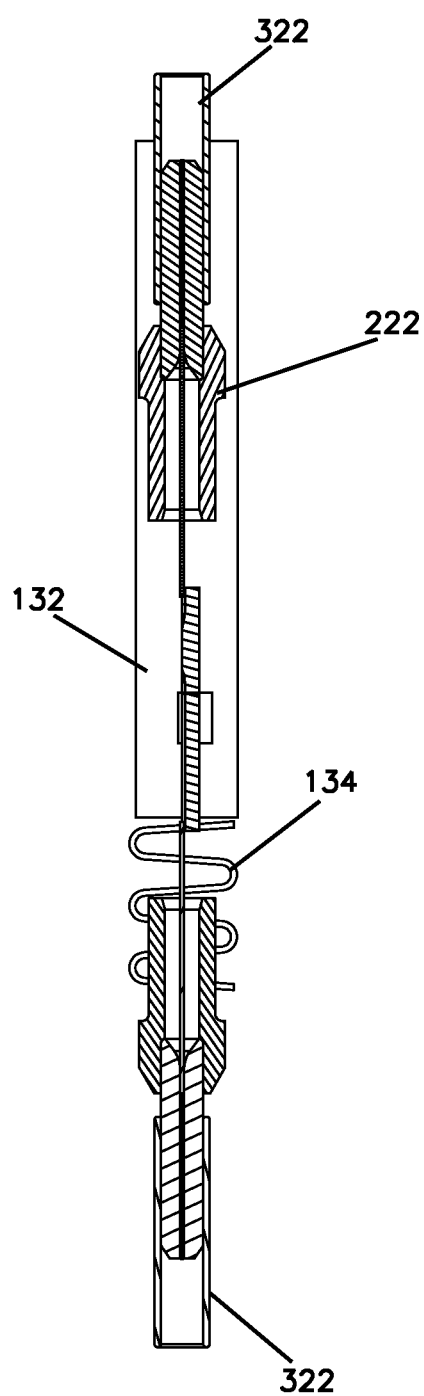
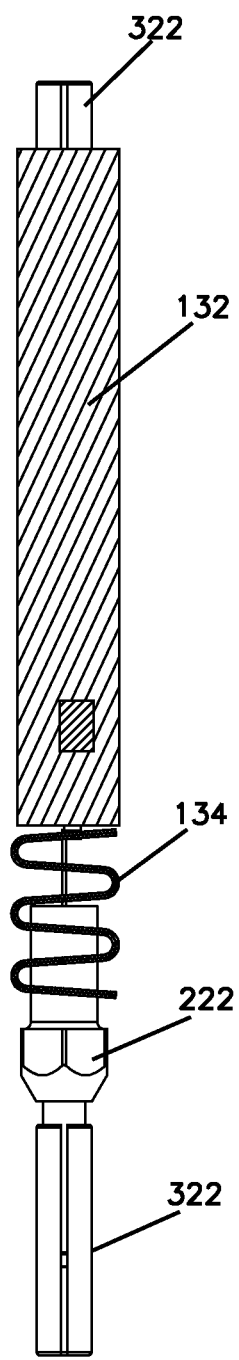

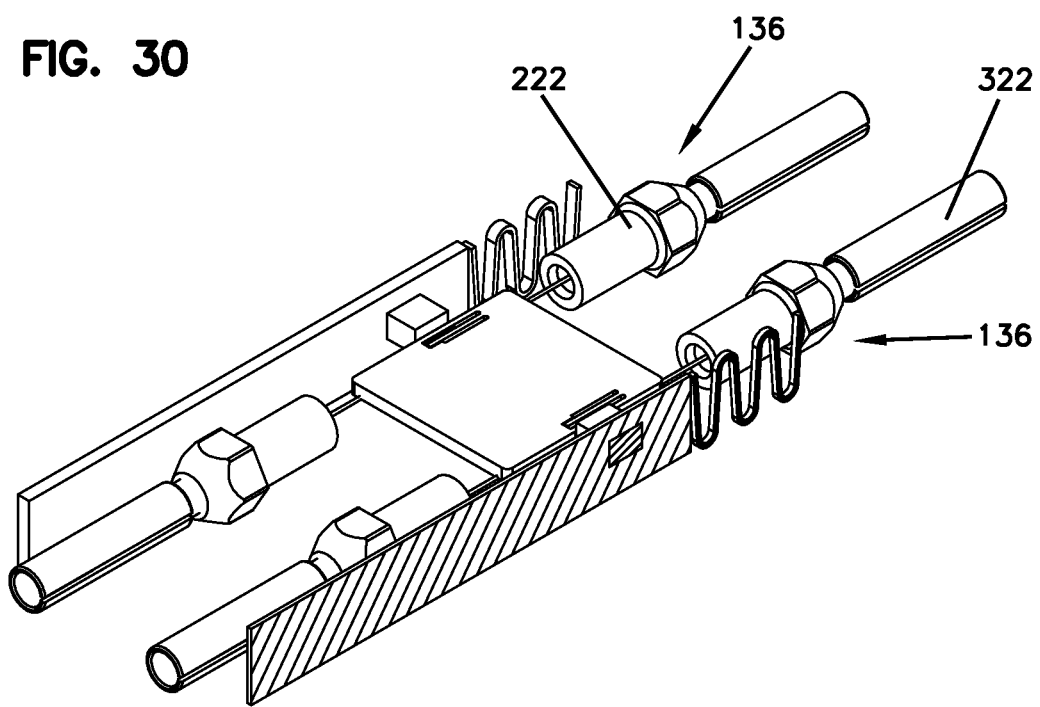

PASSIVE OPTICAL THROUGH SWITCHES

BACKGROUND

Fiber optic cables are used in the telecommunication industry to transmit light signals in high-speed data and communication systems. A standard fiber optic cable includes a fiber with an inner light transporting optical core. Surrounding the fiber is an outer protective cladding.

A fiber terminates at a fiber optic connector. Connectors are frequently used to non-permanently connect and disconnect optical elements in a fiber optic transmission system. There are many different fiber optic connector types. Some of the more common connectors are LC, FC, and SC connectors. Other types of connectors include MTRJ, MPEO, LX.5, ST, and D4-type connectors.

Fiber optic connectors can be terminated at fiber optic connection panels, which connect various pieces of fiber optic equipment. The fiber optic connection panels include ports for connecting to fiber optic connectors, to link the equipment. Various functions are useful in the fiber optic connection panels. One function is monitoring of the signal pathways. Another useful function is switching between equipment if a need arises without having to reconnect the equipment cables.

SUMMARY

In one aspect, a passive optical fiber switch includes: a housing defining a plurality of ports configured to receive fiber optic connectors; a substrate positioned within the housing, the substrate defining a plurality of waveguide paths; and an arm positioned relative to one of the plurality of ports such that the arm moves as a fiber optic connector is positioned in the one port, movement of the arm causing the waveguide paths to shift to break a normal through configuration.

In another aspect, a passive optical fiber switch includes: a housing defining a plurality of ports configured to receive fiber optic connectors; a substrate positioned within the housing, the substrate defining a plurality of waveguide paths; a first arm positioned relative a first port of the plurality of ports such that the first arm moves as a first fiber optic connector of the plurality of fiber optic connectors is positioned in the first port; a first magnet coupled to the first arm, the first magnet being moved by the first arm, movement of the first arm causing the first magnet to be positioned relative to a second magnet on one of the waveguide paths to repel the second magnet and thereby break a normal through configuration; and a first spring to move the first arm when the first fiber optic connector is removed from the first port to cause the first magnet to be positioned relative to the second magnet to attract the second magnet and thereby create the normal through configuration.

In yet another aspect, a method for switching a fiber optic connection includes: providing a housing defining a plurality of ports configured to receive fiber optic connectors, and a substrate positioned within the housing, the substrate defining a plurality of waveguide paths; and allowing an arm positioned relative to one of the plurality of ports to move as a fiber optic connector is positioned in the one port, movement of the arm causing the waveguide paths to shift to break a normal through configuration.

DESCRIPTION OF THE DRAWINGS

FIG. 4 is a side cross-sectional view taken along line A-A of the fiber optic switch of FIG. 3.
FIG. 5 is a side cross-sectional view taken along line B-B of the fiber optic switch of FIG. 3.
FIG. 11 is a side cross-sectional view taken along line A-A of the fiber optic switch of FIG. 10.
FIG. 12 is a side cross-sectional view taken along line B-B of the fiber optic switch of FIG. 10.
FIG. 18 is a side cross-sectional view taken along line A-A of the fiber optic switch of FIG. 17.
FIG. 19 is a side cross-sectional view taken along line B-B of the fiber optic switch of FIG. 17.
FIG. 25 is a side view of the fiber optic switch of FIG. 24.
FIG. 26 is a top view of the fiber optic switch of FIG. 24.
FIG. 27 is a side cross-sectional view taken along line A-A of the fiber optic switch of FIG. 26.
FIG. 28 is a side cross-sectional view taken along line B-B of the fiber optic switch of FIG. 26.
FIG. 30 is a perspective cross-sectional view taken along line B-B of the fiber optic switch of FIG. 26.

DETAILED DESCRIPTION

Figure 1:
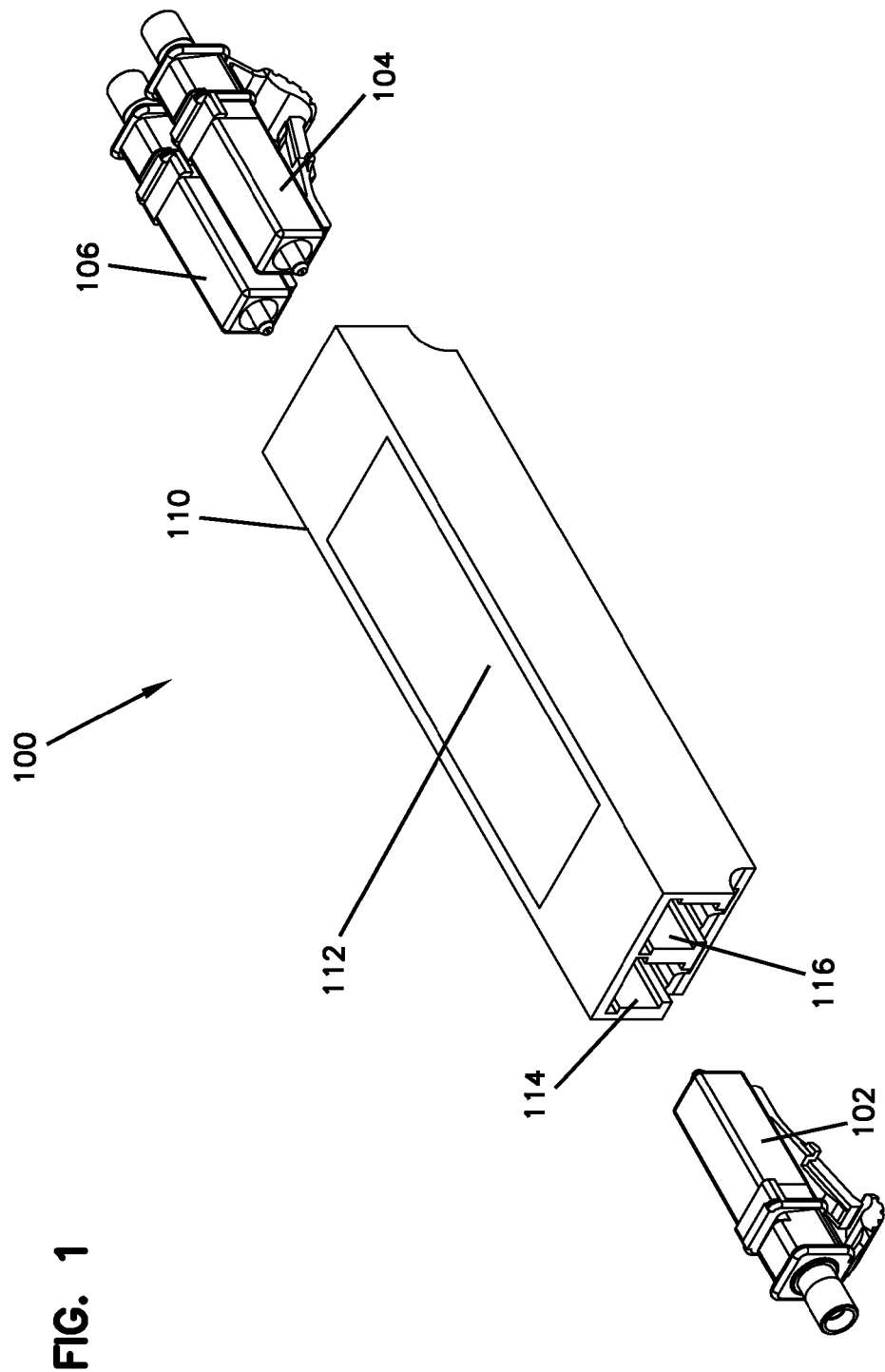
FIG. 1 is a perspective view of an example fiber optic switch with a plurality of fiber optic connectors exploded therefrom.
Figure 2:
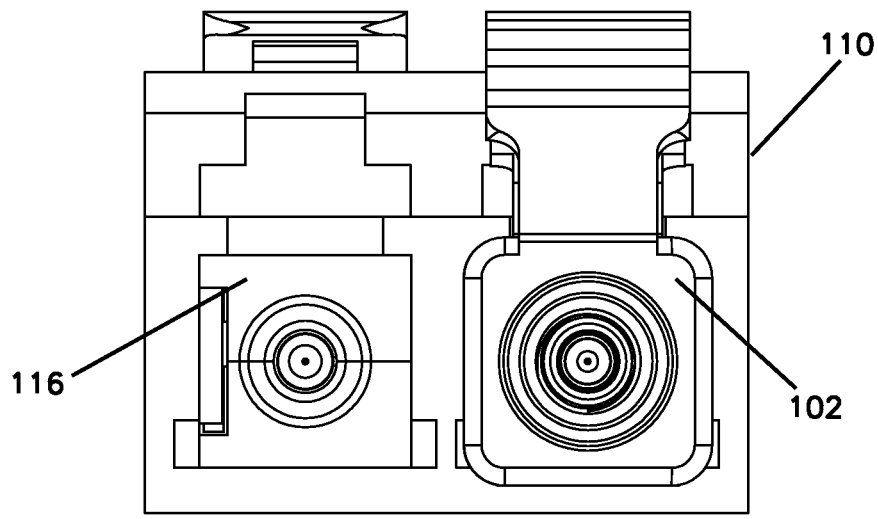
FIG. 2 is an end view of the fiber optic switch of FIG. 1.
Figure 9:
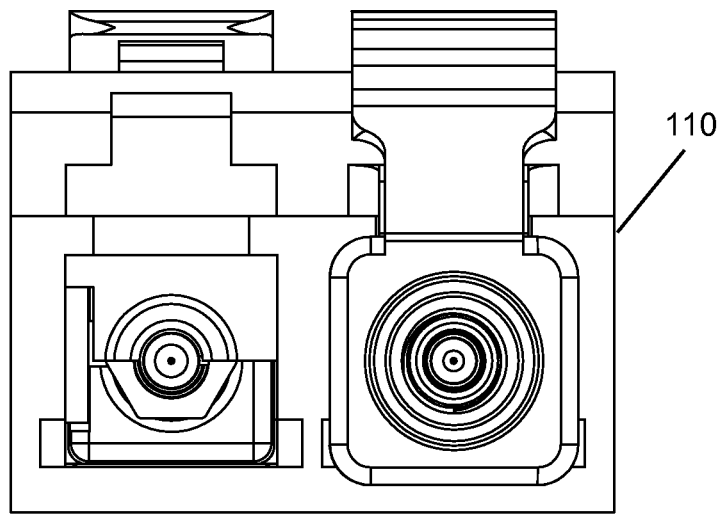
FIG. 9 is an end view of the fiber optic switch of FIG. 8.
Figure 3:
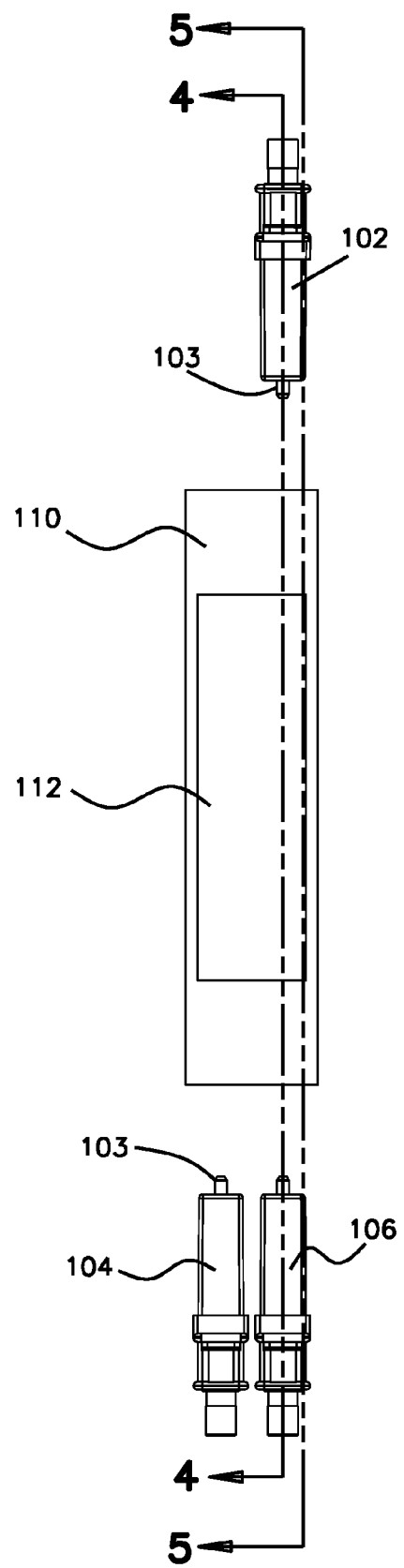
FIG. 3 is a top view of the fiber optic switch of FIG. 1.
Figure 6:
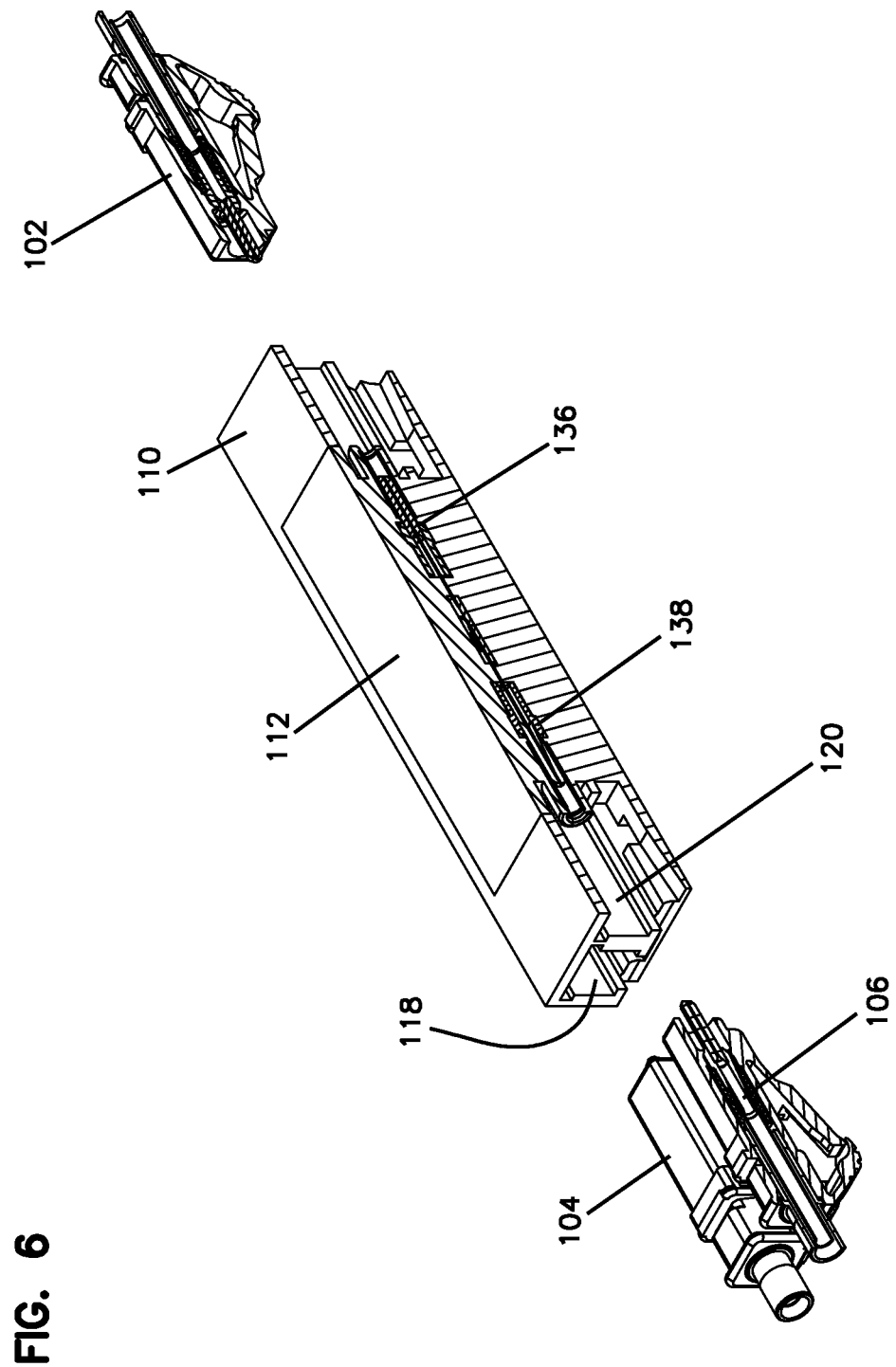
FIG. 6 is a perspective cross-sectional view taken along line A-A of the fiber optic switch of FIG. 3.
Figure 7:
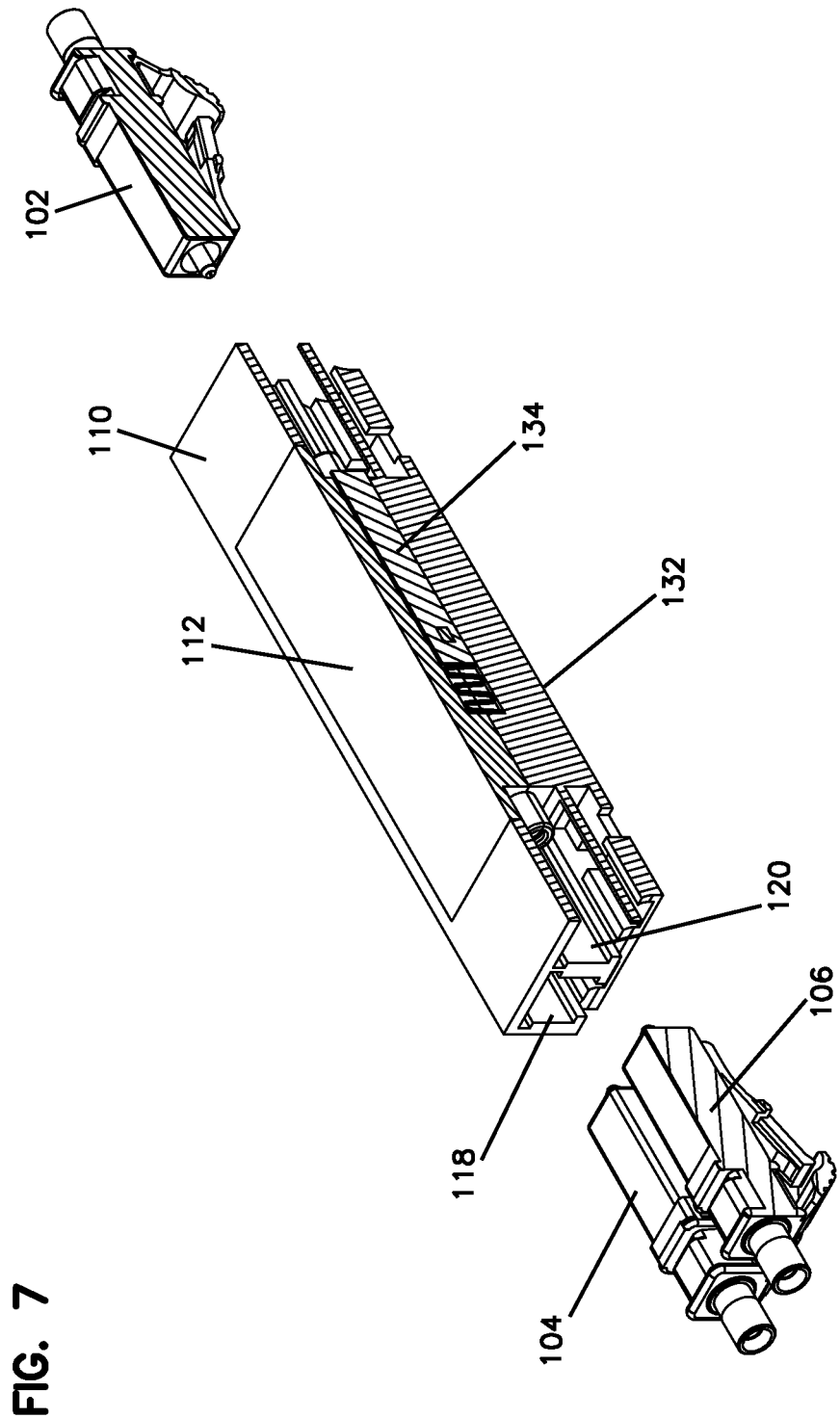
FIG. 7 is a perspective cross-sectional view taken along line B-B of the fiber optic switch of FIG. 3.
Figure 8:
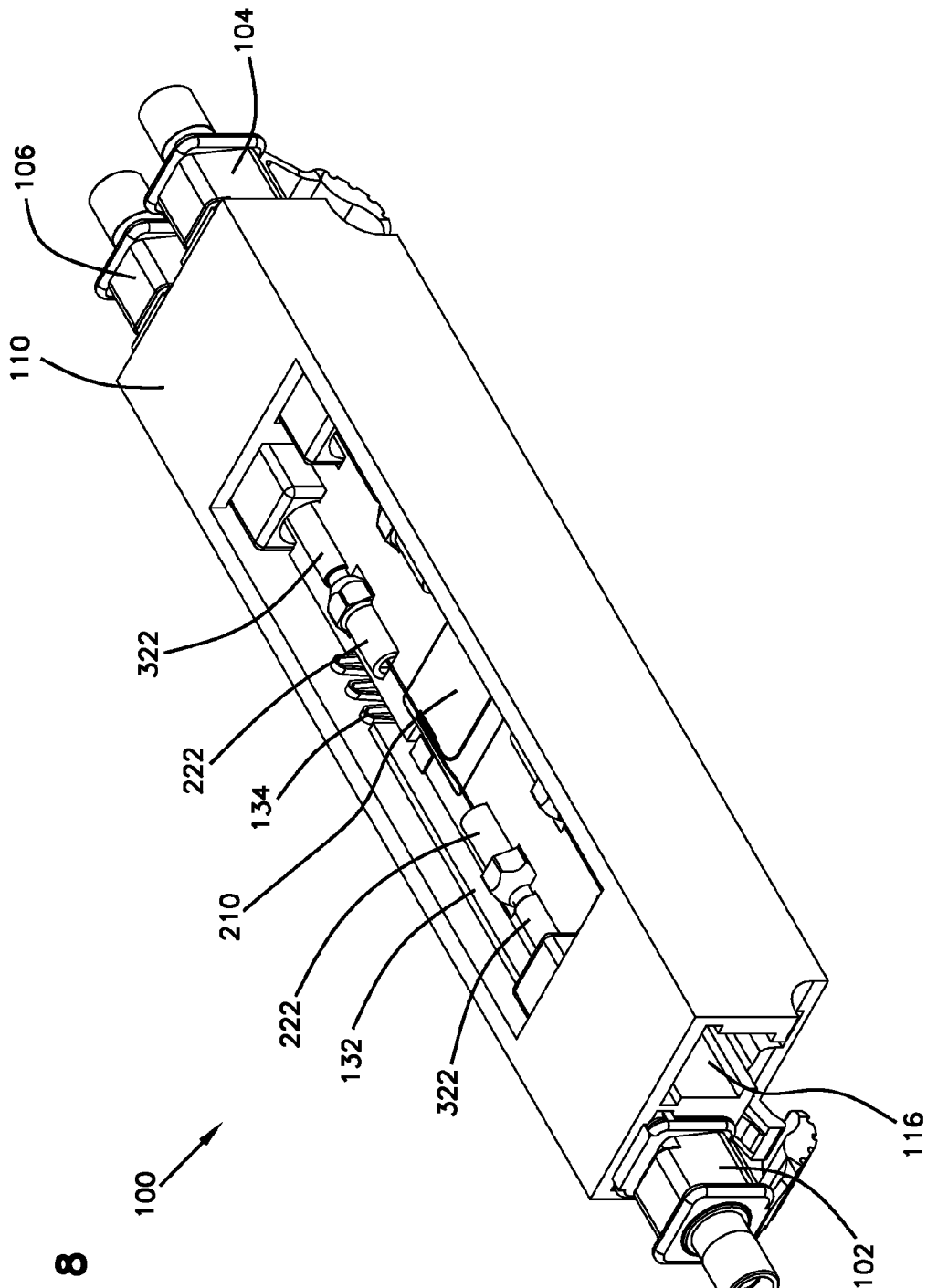
FIG. 8 is a perspective view of the fiber optic switch of FIG. 1 with a cover removed and the fiber optic connectors coupled thereto.
Figure 10:
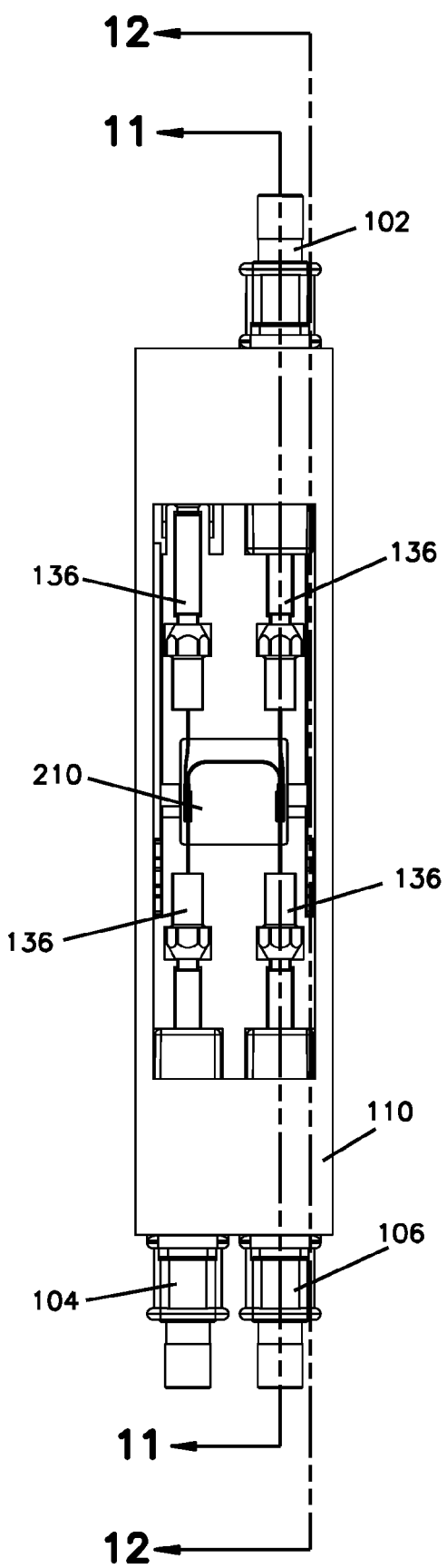
FIG. 10 is a top view of the fiber optic switch of FIG. 8.
Figure 13:
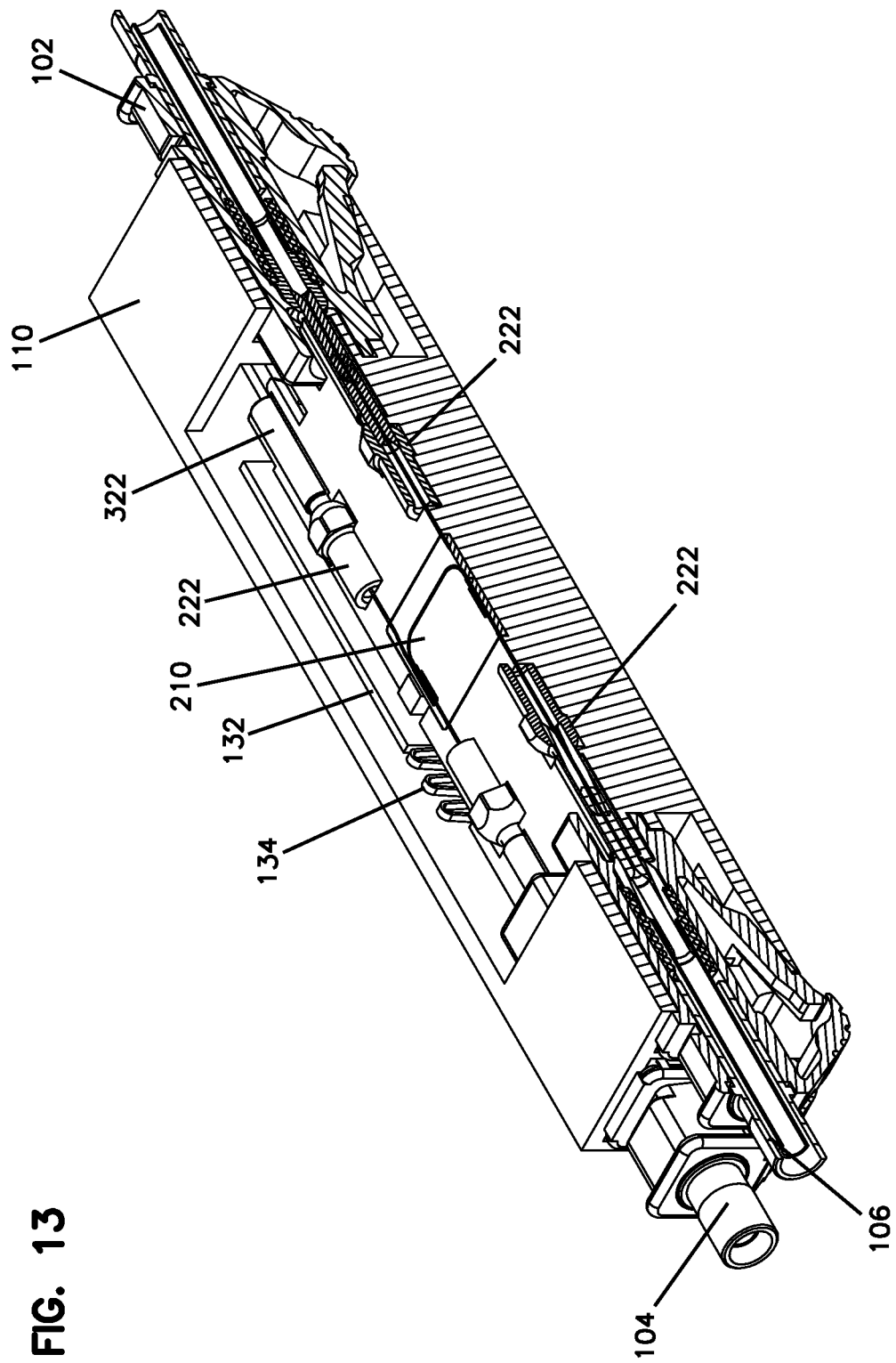
FIG. 13 is a perspective cross-sectional view taken along line A-A of the fiber optic switch of FIG. 10.
Figure 14:
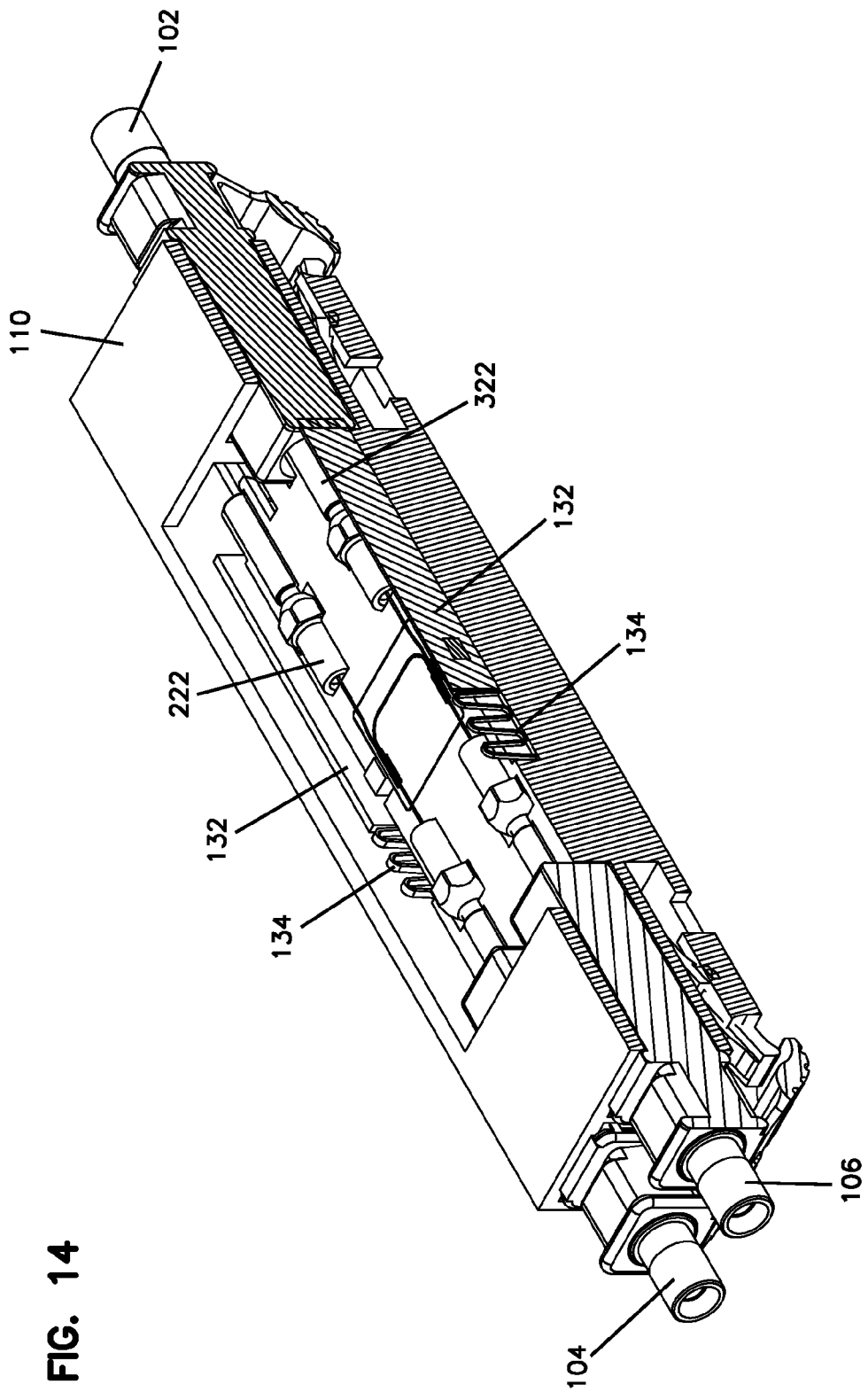
FIG. 14 is a perspective cross-sectional view taken along line B-B of the fiber optic switch of FIG. 10.
Figure 15:
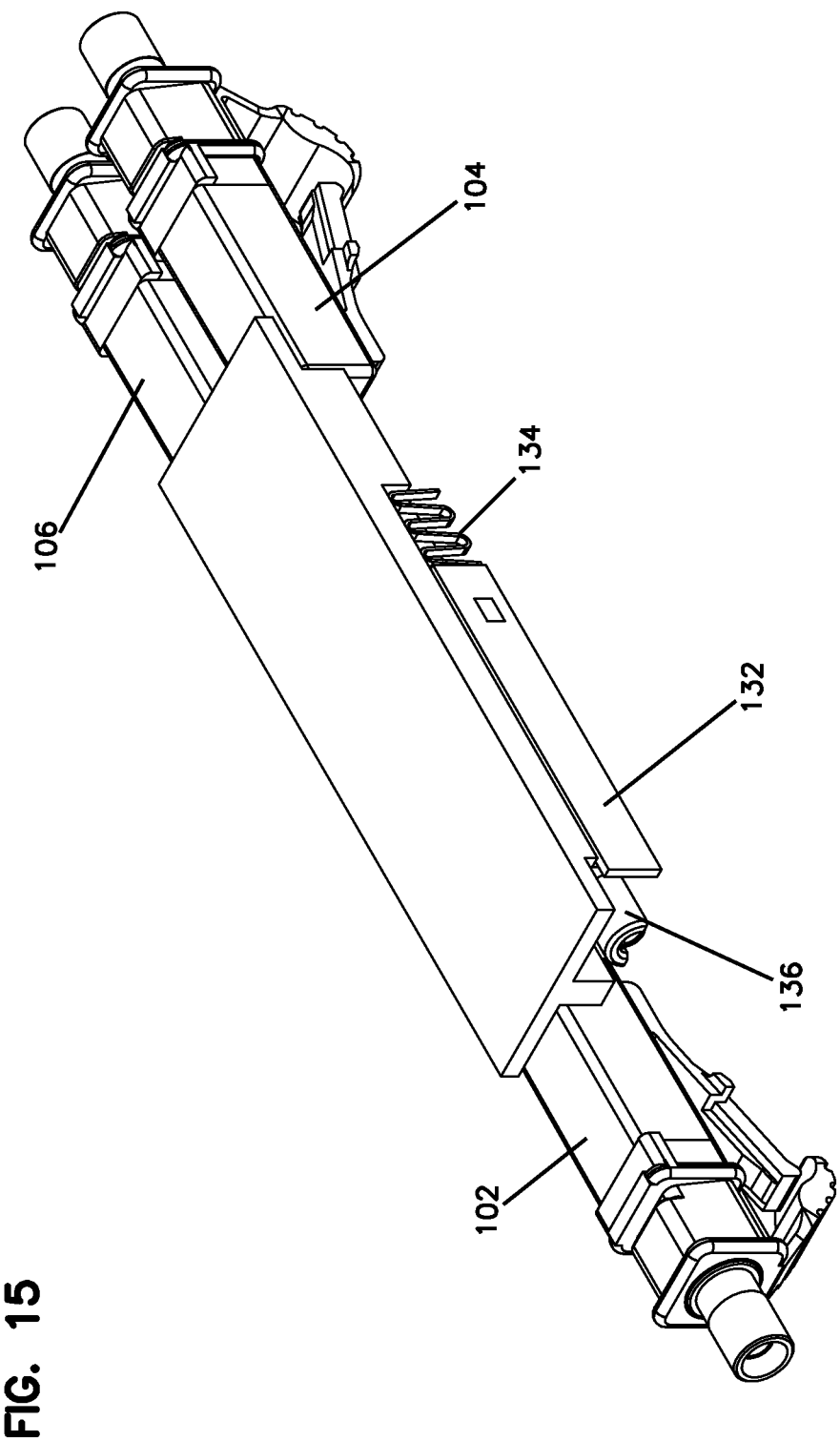
FIG. 15 is a perspective view of a portion of the fiber optic switch of FIG. 1.
Figure 16:
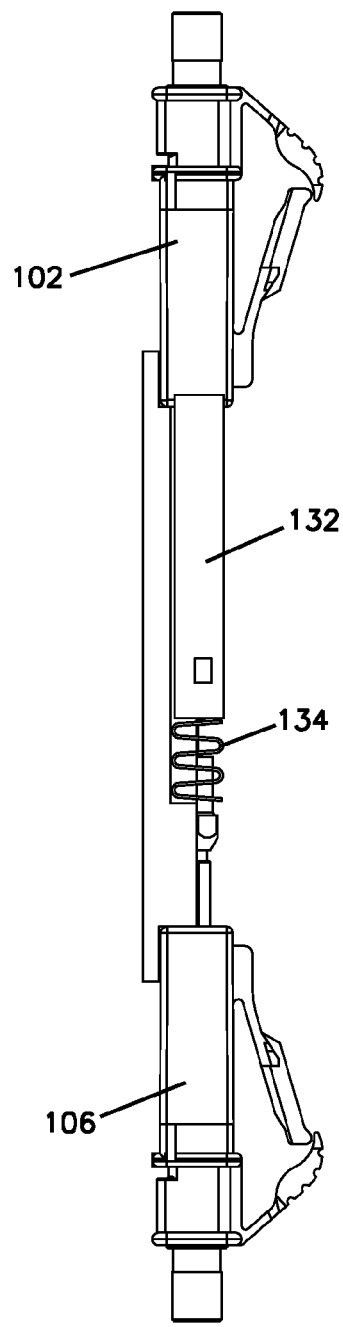
FIG. 16 is a side view of the fiber optic switch of FIG. 15.
Figure 17:
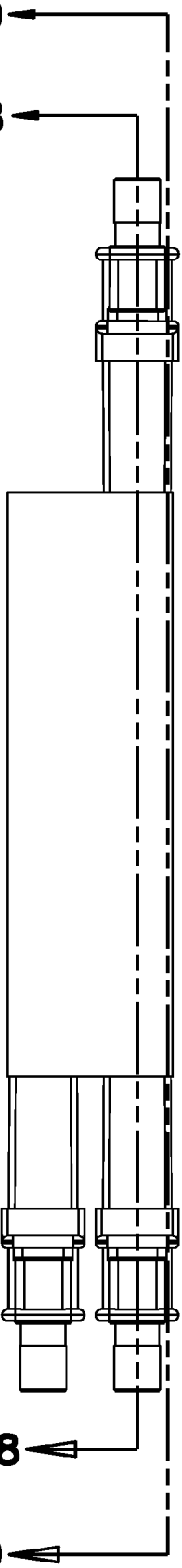
FIG. 17 is a top view of the fiber optic switch of FIG. 15.
Figure 20:
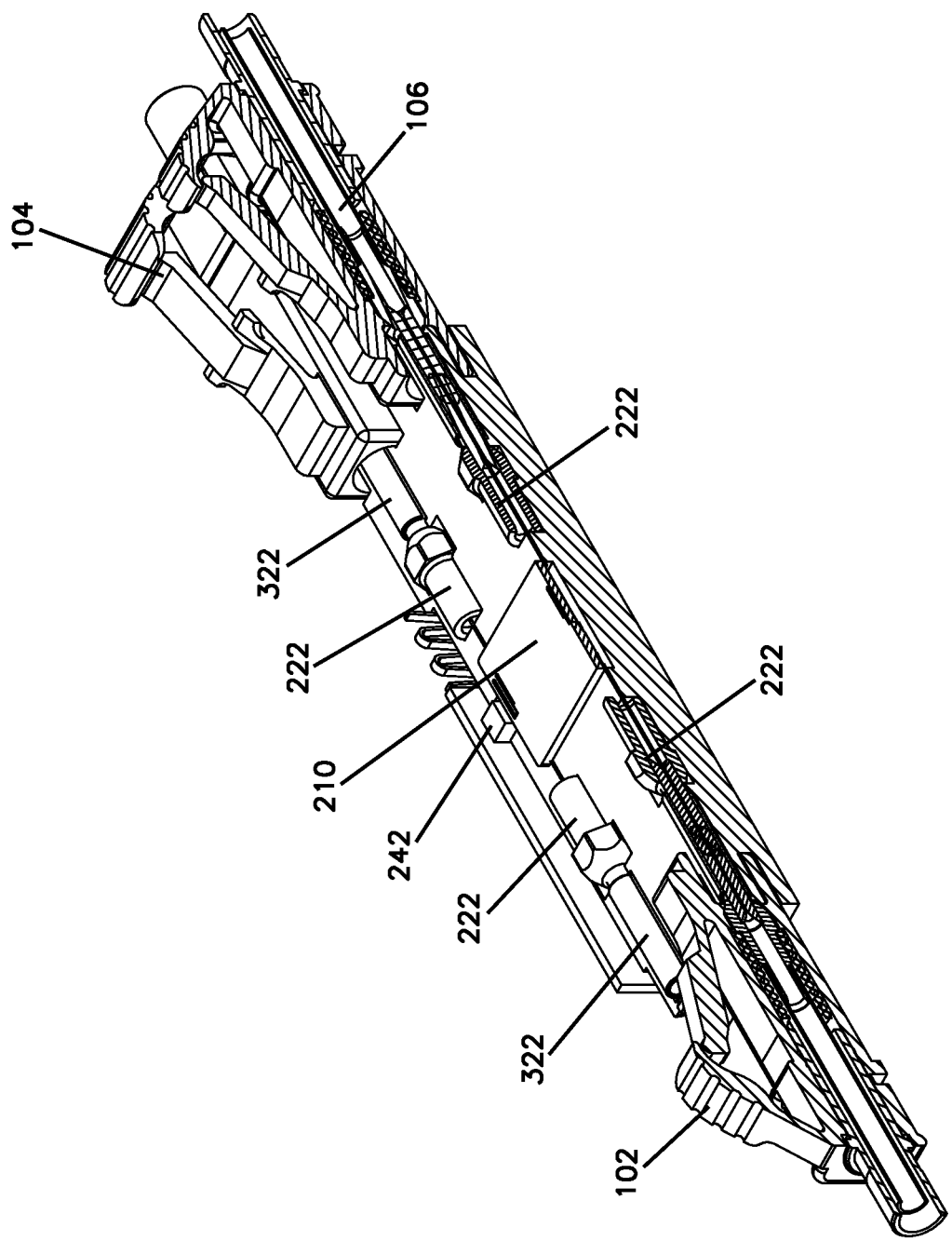
FIG. 20 is a perspective cross-sectional view taken along line A-A of the fiber optic switch of FIG. 17.
Figure 21:
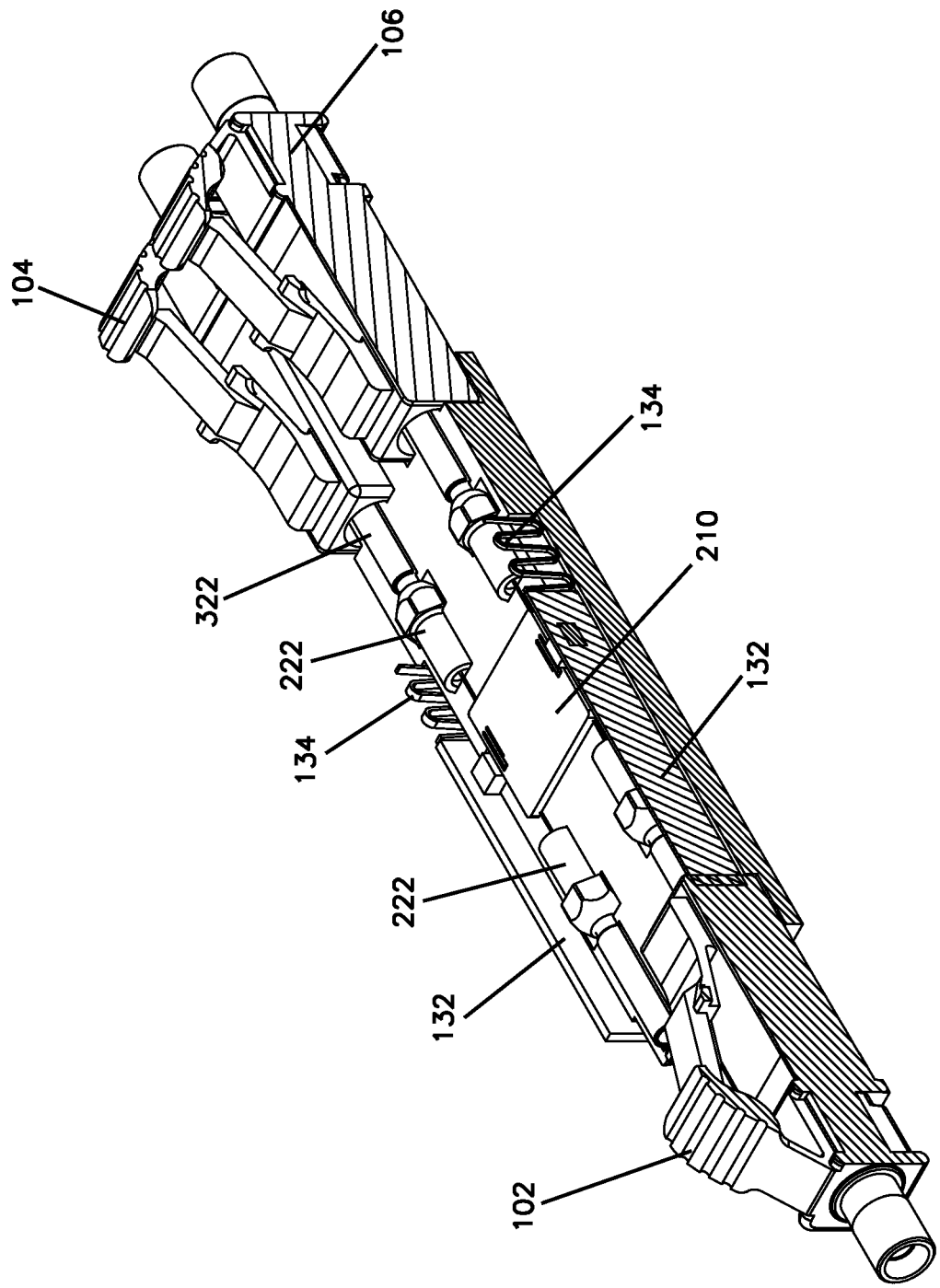
FIG. 21 is a perspective cross-sectional view taken along line B-B of the fiber optic switch of FIG. 17.
Figure 22:
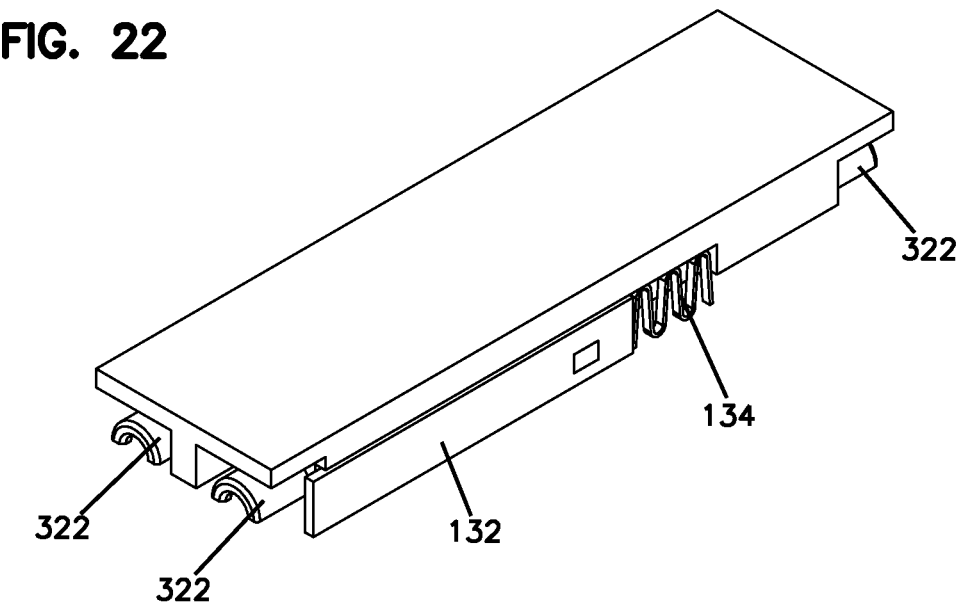
FIG. 22 is a perspective view of another portion of the fiber optic switch of FIG. 1.
Figure 23:
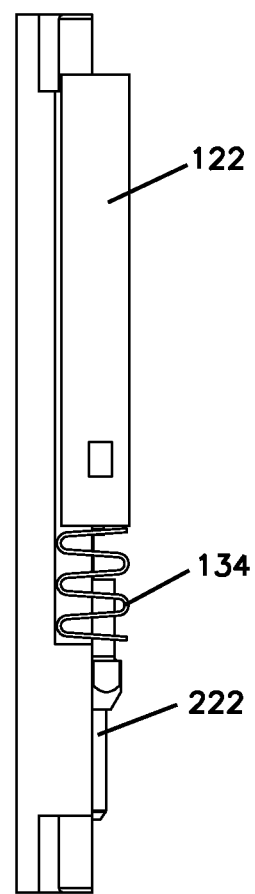
FIG. 23 is a side view of the fiber optic switch of FIG. 22.
Figure 24:
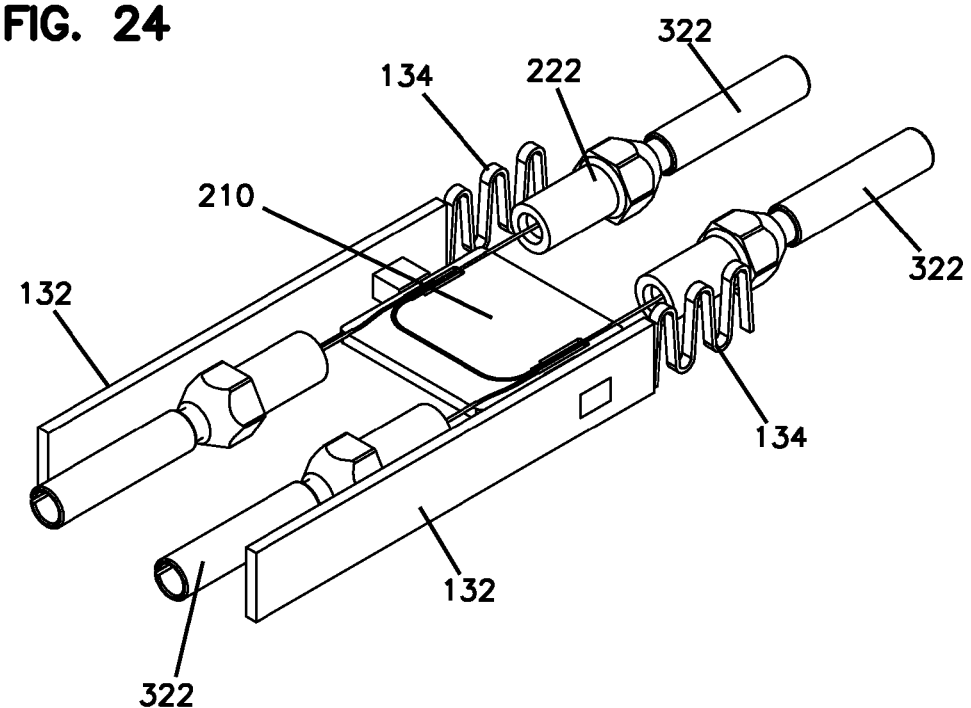
FIG. 24 is a perspective view of another portion of the fiber optic switch of FIG. 1.
Figure 29:
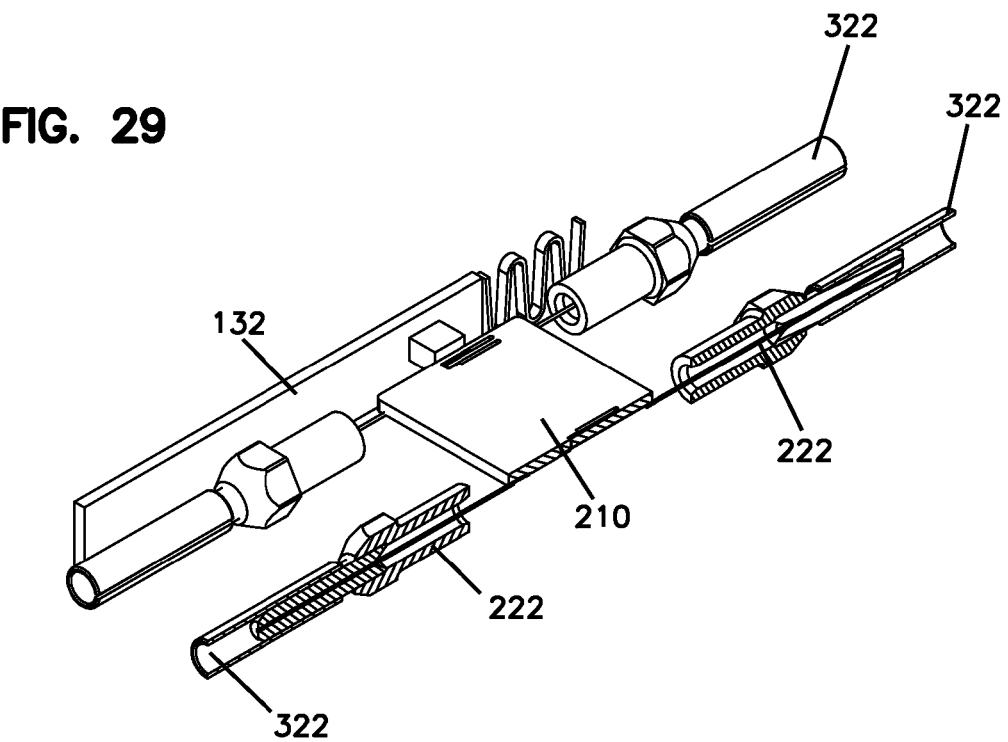
FIG. 29 is a perspective cross-sectional view taken along line A-A of the fiber optic switch of FIG. 26.

The present disclosure is directed towards passive optical through switches. Although not so limited, an appreciation of the various aspects of the present disclosure will be gained through a discussion of the examples provided below.

FIGS. 1-14 show a passive optical switch 100. The optical switch 100 includes a housing module base 110 and a cover 112. The cover 112 can be removed to access the internal components of the optical switch 100. See FIGS. 8-14. In some examples, the passive optical switch 100 is incorporated into a fiber optic connection panel, the fiber optic connection panel including a plurality of passive optical switches for interconnection thereto.

A plurality of fiber optic connectors 102, 104, 106 are shown. Although LC fiber optic connectors are shown, other connector types, such as FC, SC LX.5, ST, and/or D4-type, can be used.

The fiber optic connectors 102, 104, 106 can be connected to the optical switch 100, as described further below. The housing module base 110 defines a plurality of ports 114, 116, 118, 120. The ports 114, 116, 118, 120 are sized to accept a portion of the fiber optic connectors 102, 104, 106. See FIGS. 8-14. Each fiber optic connector 102, 104, 106 has a ferrule 103 that includes a fiber optic cable (not shown). When connected to the optical switch 100, the ferrule 103 of the fiber optic connectors 102, 104, 106 connects one of the fiber optic connectors 102, 104, 106 to another of the fiber optic connectors 102, 104, 106.

This connection is accomplished by optical sub-assemblies 136 within the housing module base 110. Each of the optical sub-assemblies 136 generally includes a ferrule assembly 222 and a sleeve 322. See FIGS. 24-30. The sleeve 322 assists in aligning the ferrule assembly 222 with the ferrule 103 of the mating fiber optic connector. The ferrule assembly 222 includes a fiber 224 that aligns with the fiber in the ferrule 103 of the fiber optic connector 102, 104, 106 to allow for optical signal transmission therethrough, as described further below.

The housing module base 110 of the optical switch 100 also includes a push arm 132 and a corresponding spring 134. Generally, the push arms 132 and the springs 134 facilitate the switching aspects of the optical switch 100.

Figure 31:
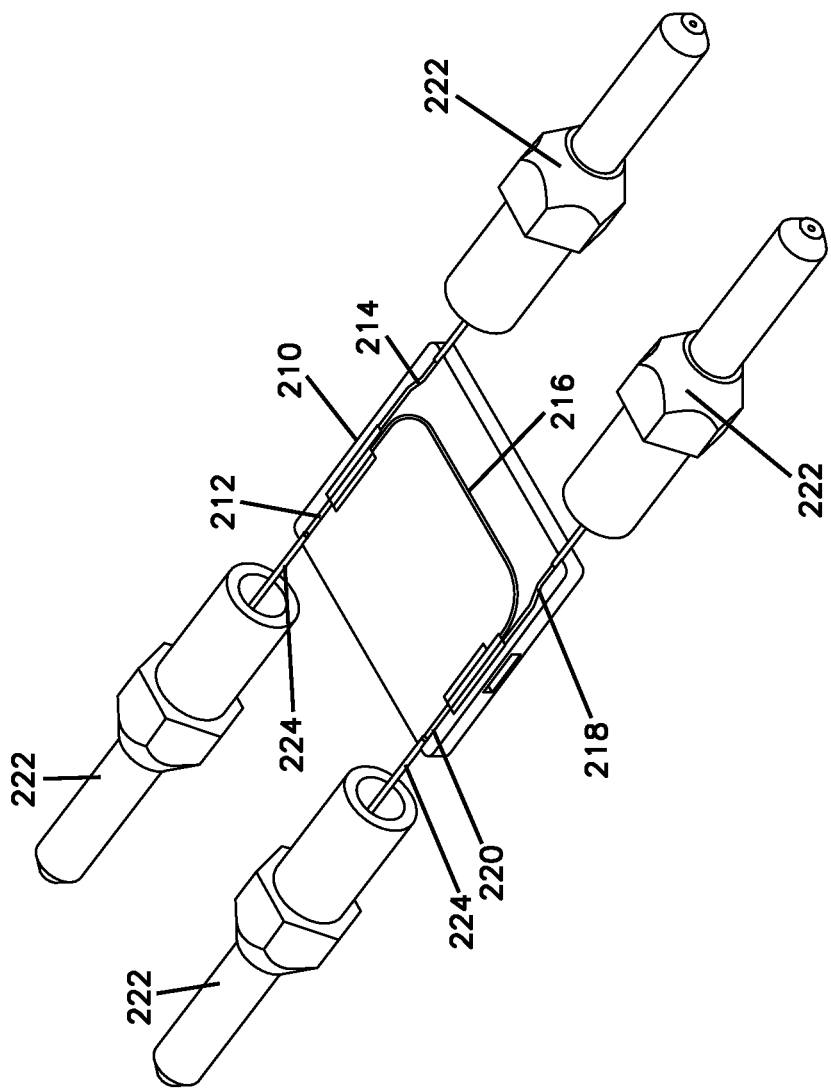
FIG. 31 is a perspective view of a portion of the fiber optic switch of FIG. 1.
Figure 32:
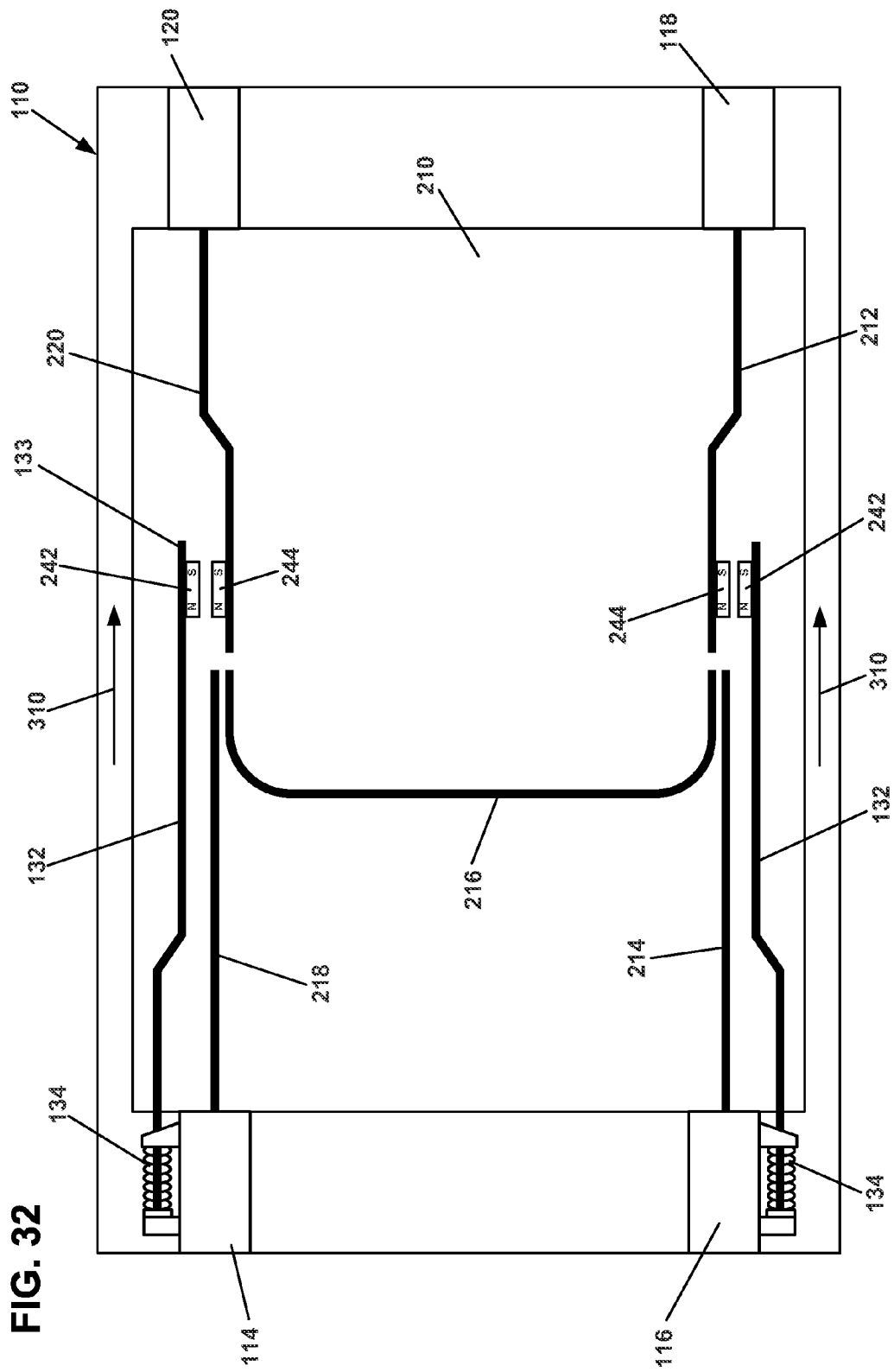
FIG. 32 is a schematic view of a portion of the fiber optic switch of FIG. 1.

Referring now to FIGS. 15-34, the connections between the ports 114, 116, 118, 120 are switched passively within the optical switch 100. Specifically, as shown in FIGS. 26 and 31-32, a ferrule assembly 222 is provided as part of each of the optical sub-assemblies 136. A fiber 224 of each ferrule assembly is coupled (e.g., bonded) to a substrate 210.

In this example, the substrate 210 is a microelectromechanical system (MEMS) that includes an optical waveguide substrate. The substrate 210 includes fiber waveguide paths 212, 214, 216, 218, 220 formed on the substrate 210. The waveguide paths 212, 214, 216, 218, 220 form the connections between the fiber optic connectors 102, 104, 106 connected to the optical switch 100. The specific paths that are formed between the ports 114, 116, 118, 120 change depending on which of the ports 114, 116, 118, 120 include the fiber optic connectors 102, 104, 106 connected thereto. This is the switching functionality of the optical switch 100.

Specifically, as shown in FIG. 32, when fiber optic connectors 104, 106 are connected to ports 118, 120, the "normal through" configuration is provided by the optical switch 100.

In this configuration, the waveguide paths 212, 216, 220 are aligned so that transmission is provided between the ports 118, 120 to the fiber optic connectors connected thereto. This is the configuration with the springs 134 in the uncompressed positions.

In the uncompressed positions, permanent magnets 242 on each of the arms 132 are positioned so that the north pole of the magnets 242 is generally aligned with the north pole of magnets 242 on the waveguide paths 212, 220, causing the magnets 242, 244 to repel one another to maintain the waveguide paths 212, 216, 220 in alignment.

Figure 33:
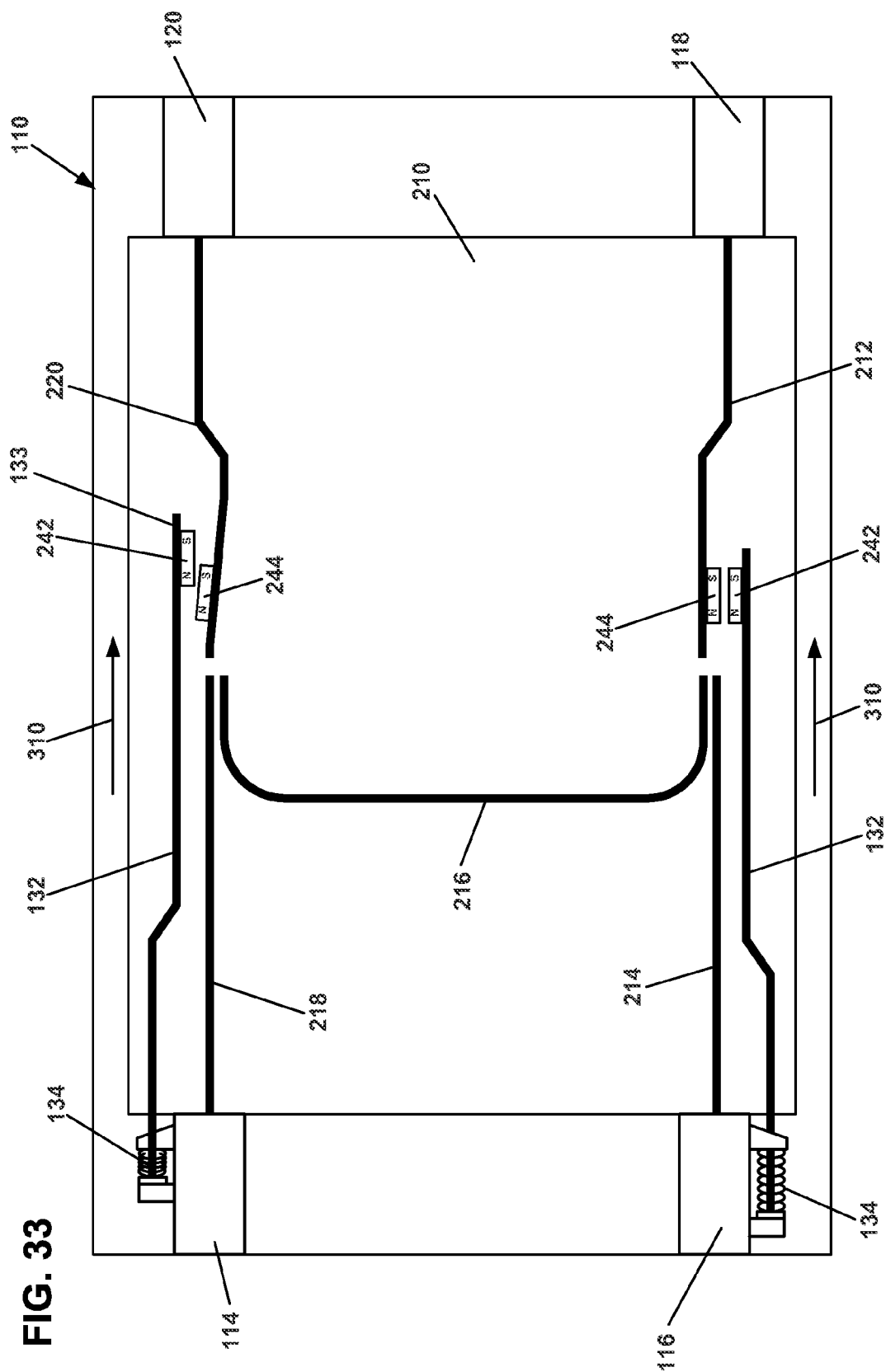
FIG. 33 is a schematic view of a portion of the fiber optic switch of FIG. 1.

Referring now to FIG. 33, when the fiber optic connector 102 is positioned in the port 114, the fiber optic connector engages and pushes the push arm 132 against the spring 134 and towards the port 120 in a direction 310. As the push arm 132 moves and compresses the spring 134, the magnet 242 on an end 133 of the push arm 132 also moves in the direction 310 relative to the magnet 244 on the waveguide path 220.

As the push arm 132 is moved by the fiber optic connector 102 being positioned in the port 114, the north pole of the push arm 132 is moved to be adjacent to the south pole of the magnet 244 on the waveguide path 220, so that the magnet 244 on the waveguide path 220 is attracted to the magnet 242 on the push arm 132. In this configuration (shown in FIG. 33), the waveguide path 220 is moved to align with the waveguide 218. In this position, transmission is provided between the fiber optic connector in the port 114 and the fiber optic connector in the port 120. In the manner, the signal path between the ports 118, 120 is broken (i.e., the normal through signal path is broken), and the signal path between the ports 114, 120 is created.

Figure 34:
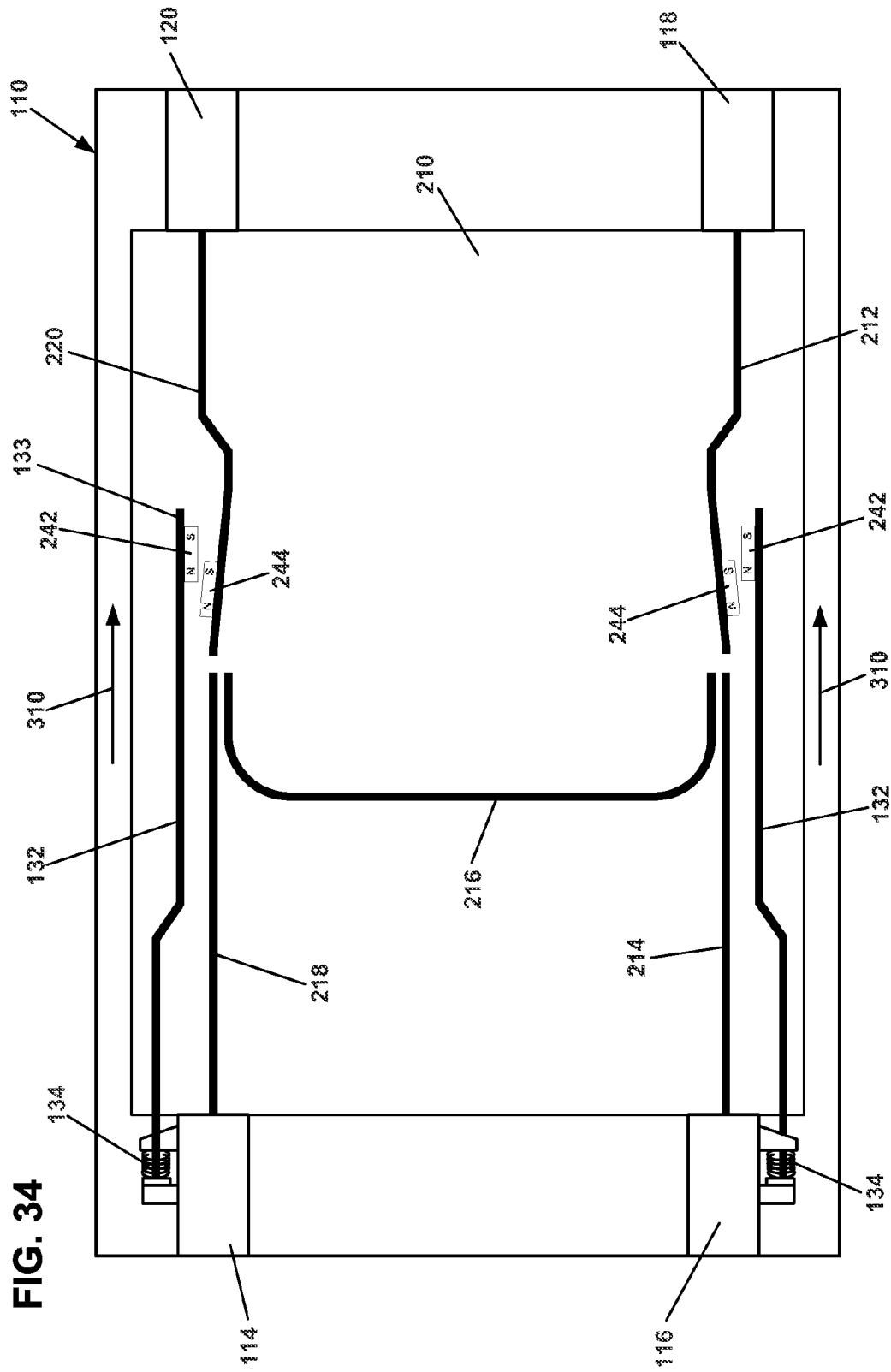
FIG. 34 is a schematic view of a portion of the fiber optic switch of FIG. 1.
Figure 35:
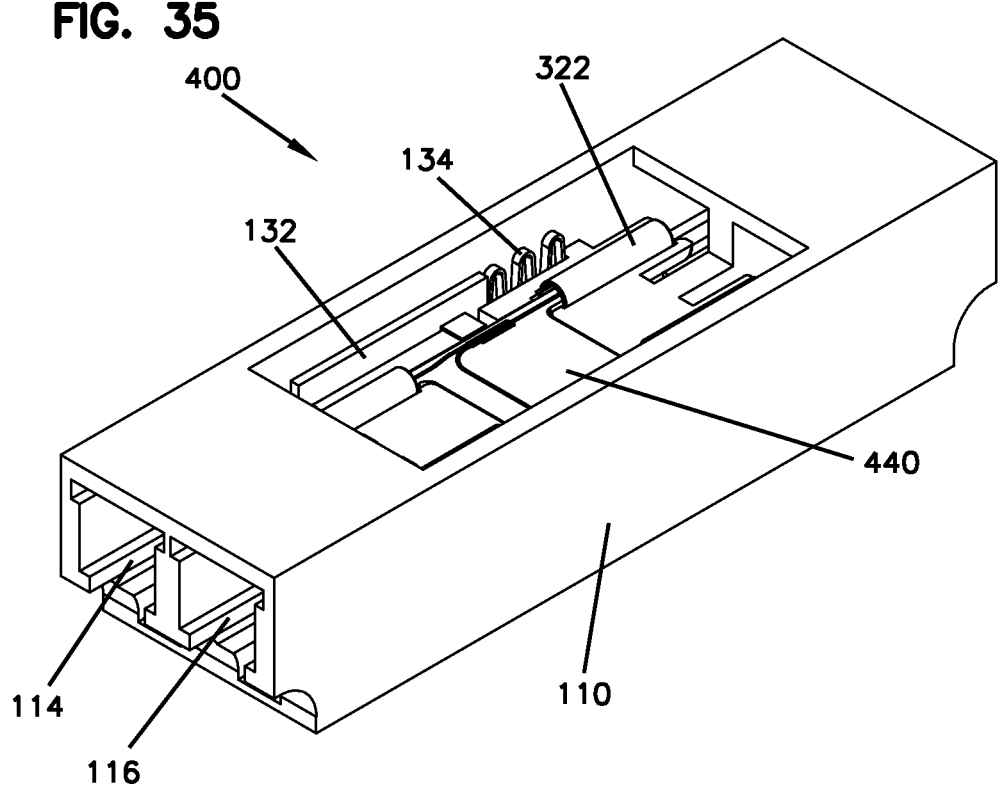
FIG. 35 is a perspective view of another example fiber optic switch.
Figure 38:
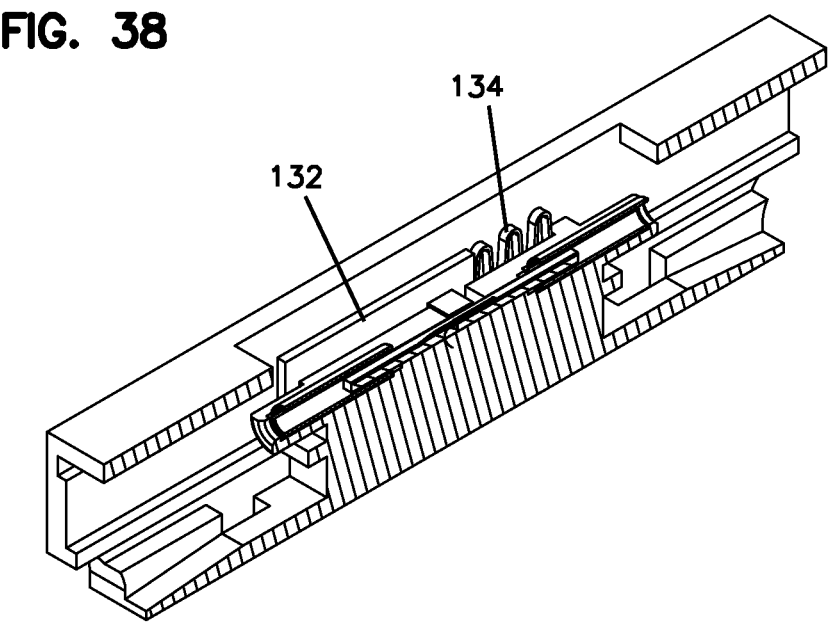
FIG. 38 is a perspective view taken along line A-A of the fiber optic switch of FIG. 36.
Figure 37:
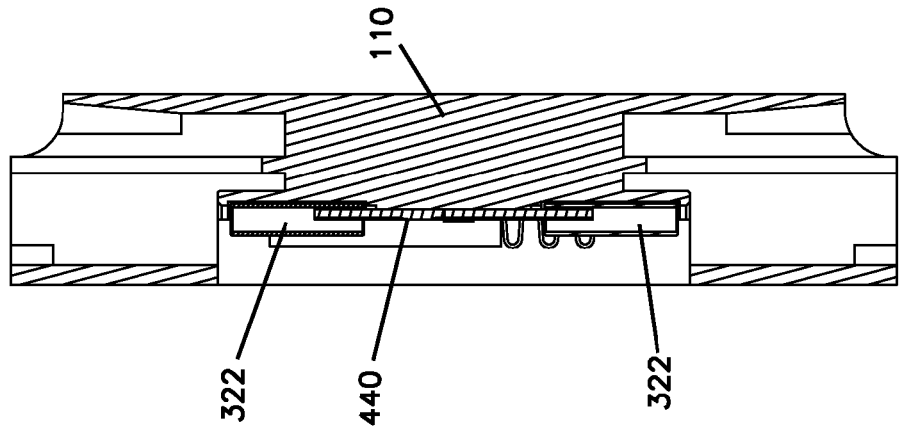
FIG. 37 is a cross-sectional view taken along line A-A of the fiber optic switch of FIG. 36.
Figure 36:
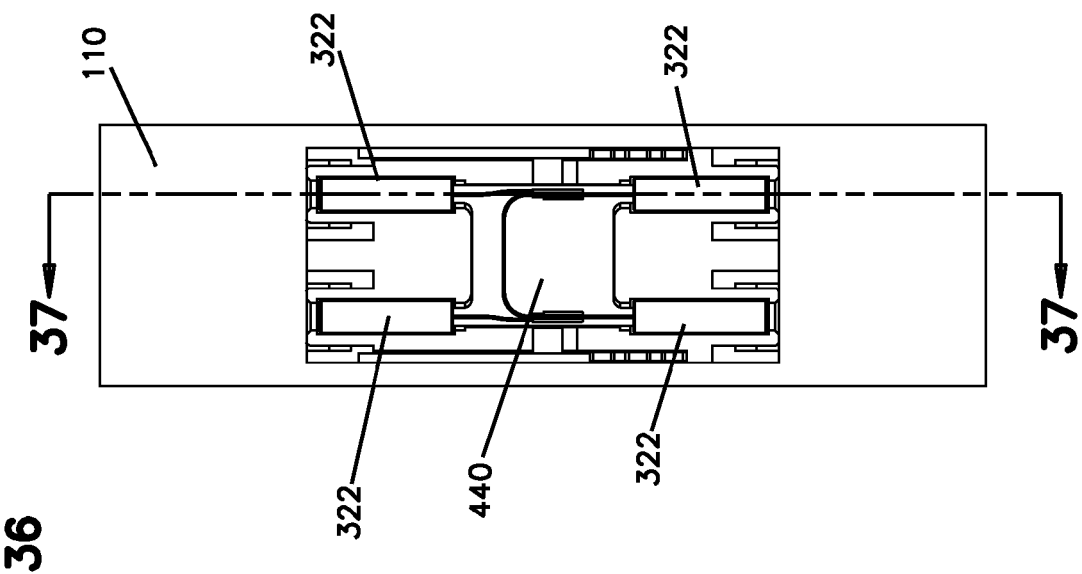
FIG. 36 is a top view of the fiber optic switch of FIG. 35.

Referring now to FIG. 34, when a fiber optic connector is placed in the port 116, a similar process occurs. Specifically, positioning of the fiber optic connector in the port 116 causes the arm 132 to move in the direction 310 towards the port 118. In doing so, the magnet 242 is moved so that a north pole of the magnet 242 is positioned adjacent to a south pole of the magnet 244 on the waveguide path 212. The magnet 244 on the waveguide path 220 is attracted to the magnet 242 on the push arm 132. In this configuration (shown in FIG. 34), the waveguide path 212 is moved to align with the waveguide 214. In this position, transmission is provided between the fiber optic connector in the port 116 and the fiber optic connector in the port 118. In the manner, the signal path between the ports 118, 120 is broken (i.e., the normal through signal path is broken), and the signal path between the ports 116, 118 is created.

As is shown, connection of a fiber optic connector in either or both of the ports 114, 116 causes the normal through connection (i.e., the signal path between the ports 118, 120) to be broken.

To move back to the normal through configuration, the fiber optic connectors in the ports 114, 116 are removed. Once removed, the springs 134 return the spring arms 132 back to the resting position, with the north and south poles of the magnets 242 generally aligned with the north and south poles of the magnets 244. This causes the waveguide paths 212, 220 to be repelled back into alignment with the waveguide path 216. The normal through signal path is thereupon recreated, connecting the signal path between the ports 118, 120.

In this example, the waveguide paths are fabricated on the single substrate 210. This allows for ease of manufacture and packaging of the substrate. In addition, the design allows for other modules to be connected to the substrate to provide enhanced functionality, such as power monitoring, attenuation, and/or mirroring of the data stream. Other configurations are possible.

Referring now to FIGS. 35-40, another embodiment of an optical switch 400 is shown. The optical switch 400 is similar in design to that of the optical switch 100 described above, except that the optical switch 400 does not include the ferrule assemblies 222.

Figure 39:
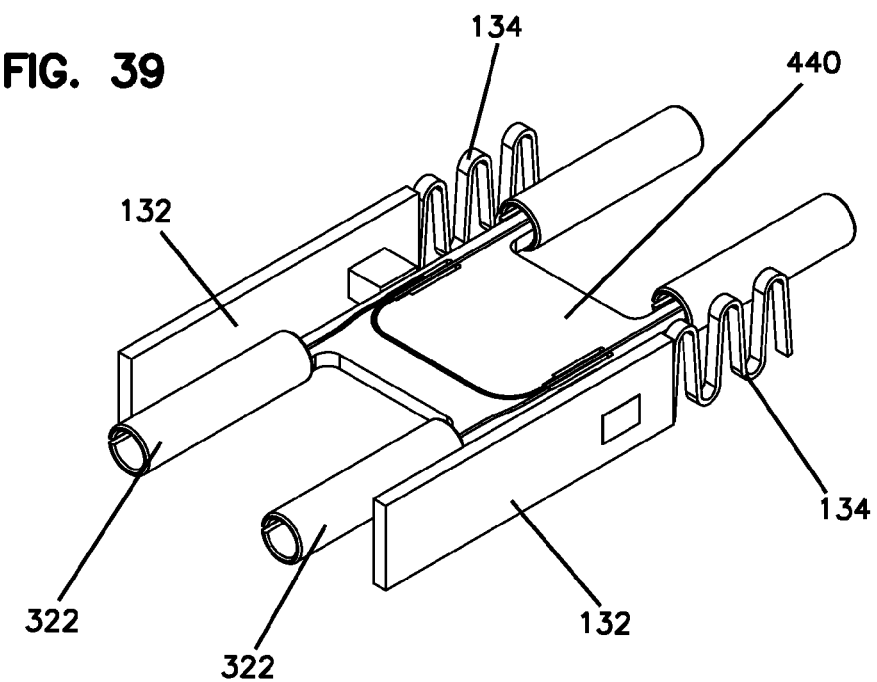
FIG. 39 is a perspective view of a portion of the fiber optic switch of FIG. 35.
Figure 40:
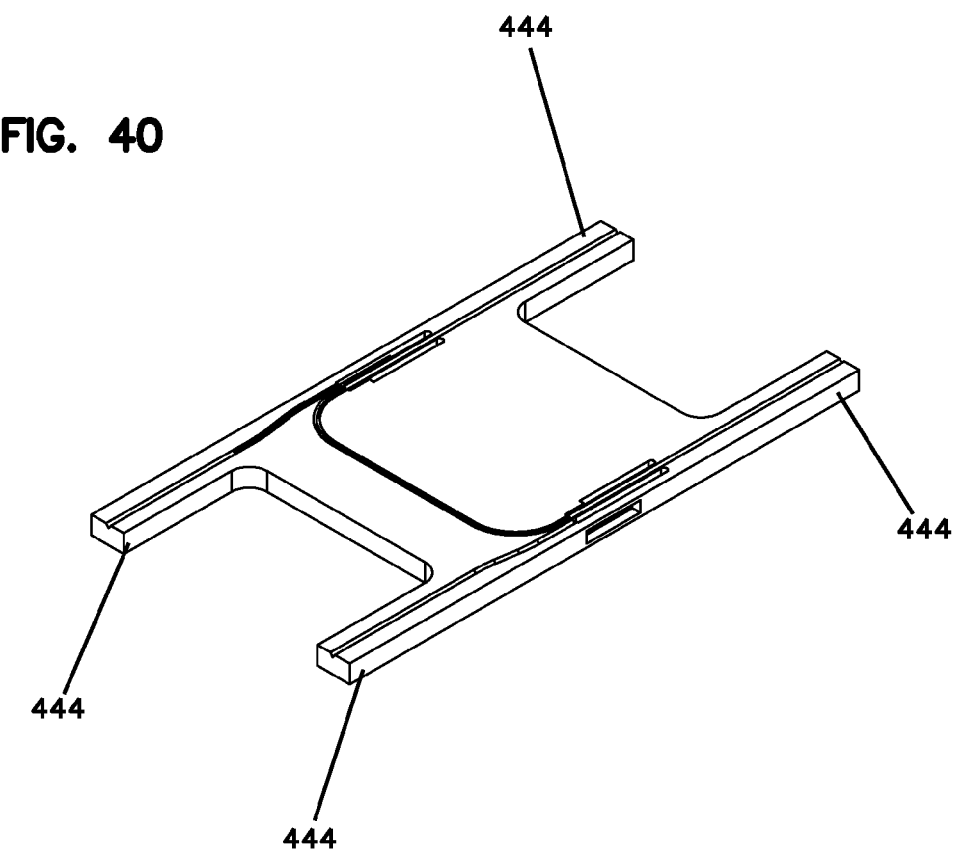
FIG. 40 is a top view an example substrate of the fiber optic switch of FIG. 39.
Figure 41:
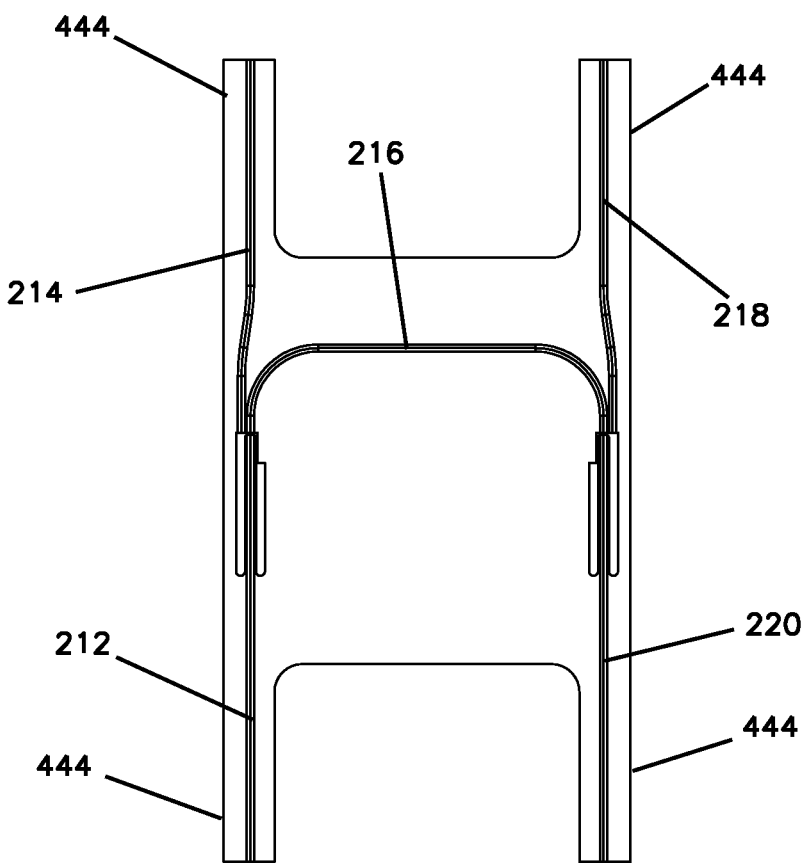
FIG. 41 is a top view of the substrate of FIG. 40.

Instead, as shown in FIGS. 39-40, arms 444 extend from a substrate 440 of the optical switch 400 and function in a manner similar to that of the ferrule assemblies 222.

Specifically, the sleeves 322 are positioned about the arms 444 to guide the ferrules 103 of the mating fiber optic connectors 102, 104, 106 to the waveguide paths 212, 214, 218, 220 extending respectively along the arms 444 to form the optical transmission paths therealong. Other configurations are possible.

The optical fiber switches described herein provide automatic switching without requiring external power. This passive switching can be more robust and efficient.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A passive optical fiber switch, comprising:
   a housing defining a plurality of ports configured to receive fiber optic connectors in an axial direction;
   a substrate positioned within the housing, the substrate defining a plurality of waveguide paths;
   an arm positioned relative to one of the plurality of ports such that the arm moves in the axial direction as a fiber optic connector is positioned in the one port, movement of the arm causing the waveguide paths to shift to break a normal through configuration;
   a spring positioned to move the arm in the axial direction into the normal through configuration; and
   a first magnet coupled to the arm, the first magnet being positioned relative to a second magnet coupled to one of the waveguide paths, the first magnet causing the second magnet to move the one waveguide path to break the normal through configuration.

2. The passive optical fiber switch of claim 1, further comprising a ferrule sub-assembly positioned between each of the plurality of ports and the plurality of waveguide paths.

3. The passive optical fiber switch of claim 1, wherein the spring is compressed by the arm when the arm is moved as the fiber optic connector is positioned in the one port.

4. The passive optical fiber switch of claim 1, further comprising a ferrule sub-assembly positioned between each of the plurality of ports and the plurality of waveguide paths.

5. The passive optical fiber switch of claim 4, wherein each ferrule sub-assembly includes a sleeve and a ferrule.

6. The passive optical fiber switch of claim 1, wherein the spring is compressed by the arm when the arm is moved as the fiber optic connector is positioned in the one port.

7. The passive optical fiber switch of claim 1, wherein the substrate includes a plurality of arms, each of the arms extending from the substrate to one of the plurality of ports.

8. A passive optical fiber switch, comprising:
   a housing defining a plurality of ports configured to receive fiber optic connectors;
   a substrate positioned within the housing, the substrate defining a plurality of waveguide paths;
   a first arm positioned relative a first port of the plurality of ports such that the first arm moves as a first fiber optic connector of the plurality of fiber optic connectors is positioned in the first port;
   a first magnet coupled to the first arm, the first magnet being moved by the first arm, movement of the first arm causing the first magnet to be positioned relative to a second magnet on one of the waveguide paths to repel the second magnet and thereby break a normal through configuration; and
   a first spring to move the first arm when the first fiber optic connector is removed from the first port to cause the first magnet to be positioned relative to the second magnet to attract the second magnet and thereby create the normal through configuration.

9. The passive optical fiber switch of claim 8, further comprising:
   a second arm positioned relative a second port of the plurality of ports such that a second arm moves as a second fiber optic connector of the plurality of fiber optic connectors is positioned in the second port;
   a third magnet coupled to the second arm, the third magnet being moved by the second arm, movement of the second arm causing the third magnet to be positioned relative to a fourth magnet on one of the waveguide paths to repel the fourth magnet and thereby break a normal through configuration; and
   a second spring to move the second arm when the second fiber optic connector is removed from the second port to cause the third magnet to be positioned relative to the fourth magnet to attract the fourth magnet and thereby create the normal through configuration.

10. The passive optical fiber switch of claim 8, further comprising a ferrule sub-assembly positioned between each of the plurality of ports and the plurality of waveguide paths.

11. The passive optical fiber switch of claim 10, wherein each ferrule sub-assembly includes a sleeve and a ferrule.

12. The passive optical fiber switch of claim 1, wherein the substrate includes a plurality of arms, each of the arms extending from the substrate to one of the plurality of ports.

13. A method for switching a fiber optic connection, the method comprising:
   providing a housing defining a plurality of ports configured to receive fiber optic connectors, and a substrate positioned within the housing, the substrate defining a plurality of waveguide paths;
   allowing an arm positioned relative to one of the plurality of ports to move as a fiber optic connector is positioned in the one port, movement of the arm causing the waveguide paths to shift to break a normal through configuration;
   positioning a spring to move the arm into the normal through configuration;
   allowing the spring to be compressed by the arm when the arm is moved as the fiber optic connector is positioned in the one port; and
   positioning a first magnet coupled to the arm relative to a second magnet coupled to one of the waveguide paths, the first magnet causing the second magnet to move the one waveguide path to break the normal through configuration.

14. The method of claim 13, further comprising providing a ferrule sub-assembly positioned between each of the plurality of ports and the plurality of waveguide paths.

* * * * *